(12) United States Patent
Ishikawa

(10) Patent No.: US 11,409,424 B2
(45) Date of Patent: Aug. 9, 2022

(54) INFORMATION PROCESSING APPARATUS, CONTROL METHOD, AND STORAGE MEDIUM FOR CONTROLLING A VIRTUAL VIEWPOINT OF A VIRTUAL VIEWPOINT IMAGE

(71) Applicant: CANON KABUSHIKI KAISHA, Tokyo (JP)

(72) Inventor: Rei Ishikawa, Wako (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 16/288,436

(22) Filed: Feb. 28, 2019

(65) Prior Publication Data
US 2019/0265876 A1    Aug. 29, 2019

(30) Foreign Application Priority Data
Feb. 28, 2018 (JP) .............................. JP2018-035422

(51) Int. Cl.
*G06F 3/04847* (2022.01)
*G06F 3/0486* (2013.01)
*G06F 3/04845* (2022.01)

(52) U.S. Cl.
CPC ........ *G06F 3/04847* (2013.01); *G06F 3/0486* (2013.01); *G06F 3/04845* (2013.01)

(58) Field of Classification Search
CPC ........ G01N 21/95; G08B 13/19; G06F 3/048; G06F 3/0486; G06F 3/04847; G06F 3/04845; H04N 5/24; H04N 5/23
See application file for complete search history.

(56) References Cited

U.S. PATENT DOCUMENTS 5,748,194 A * 5/1998 Chen ....................... G06T 15/10
345/427
6,769,131 B1* 7/2004 Tanaka ................... H04N 7/181
348/E7.086
(Continued)

FOREIGN PATENT DOCUMENTS

| JP | 2007195091 A | 8/2007 |
| JP | 2010061545 A | 3/2010 |
| JP | 2015187797 A | 10/2015 |

OTHER PUBLICATIONS

Notice for Reasons for Refusal issued by the Japan Patent Office dated Oct. 22, 2021 in corresponding JP Patent Application No. 2018-035422, with English translation.

*Primary Examiner* — Jennifer N Welch
*Assistant Examiner* — Qi Wan
(74) *Attorney, Agent, or Firm* — Carter, DeLuca & Farrell LLP

(57) ABSTRACT

An information processing apparatus configured to output a parameter related to a virtual viewpoint which is used for generating a virtual viewpoint image based on a plurality of images captured by a plurality of cameras, comprises: a reception unit configured to receive an input according to a user operation; a determination unit configured to determine, based on an input according to a second user operation received by the reception unit, whether to apply a predetermined restriction to determination of a parameter which is based on an input according to a first user operation received by the reception unit; and an output unit configured to output, if the determination unit determines that the predetermined restriction should be applied, the parameter determined based on the predetermined restriction and the input according to the first user operation received by the reception unit.

19 Claims, 15 Drawing Sheets

(56) References Cited

U.S. PATENT DOCUMENTS

| | | | | |
|---|---|---|---|---|
| 2002/0190991 | A1* | 12/2002 | Efran | H04N 5/2224 |
| | | | | 345/475 |
| 2004/0085335 | A1* | 5/2004 | Burlnyk | G06T 19/00 |
| | | | | 715/716 |
| 2005/0075167 | A1* | 4/2005 | Beaulieu | G07F 17/3211 |
| | | | | 463/32 |
| 2005/0273830 | A1* | 12/2005 | Silver | H04N 21/435 |
| | | | | 725/105 |
| 2009/0262206 | A1* | 10/2009 | Park | G08B 13/19641 |
| | | | | 348/218.1 |
| 2010/0045667 | A1* | 2/2010 | Kornmann | G06F 1/1626 |
| | | | | 345/419 |
| 2010/0283758 | A1* | 11/2010 | Homma | G06F 3/0416 |
| | | | | 345/174 |
| 2012/0099804 | A1* | 4/2012 | Aguilera | G06T 15/20 |
| | | | | 382/285 |
| 2012/0154599 | A1* | 6/2012 | Huang | H04N 5/232 |
| | | | | 348/169 |
| 2012/0262458 | A1* | 10/2012 | Fowler | G06F 3/04845 |
| | | | | 345/427 |
| 2013/0207965 | A1* | 8/2013 | Hori | G01N 21/9515 |
| | | | | 345/419 |
| 2015/0074611 | A1* | 3/2015 | Kontkanen | G06F 3/04815 |
| | | | | 715/850 |
| 2015/0103197 | A1* | 4/2015 | Djordjevic | G06T 15/205 |
| | | | | 348/218.1 |
| 2018/0139374 | A1* | 5/2018 | Yu | H04N 21/21805 |
| 2018/0160049 | A1* | 6/2018 | Aizawa | H04N 5/247 |
| 2018/0204381 | A1* | 7/2018 | Kanatsu | H04N 13/282 |

* cited by examiner

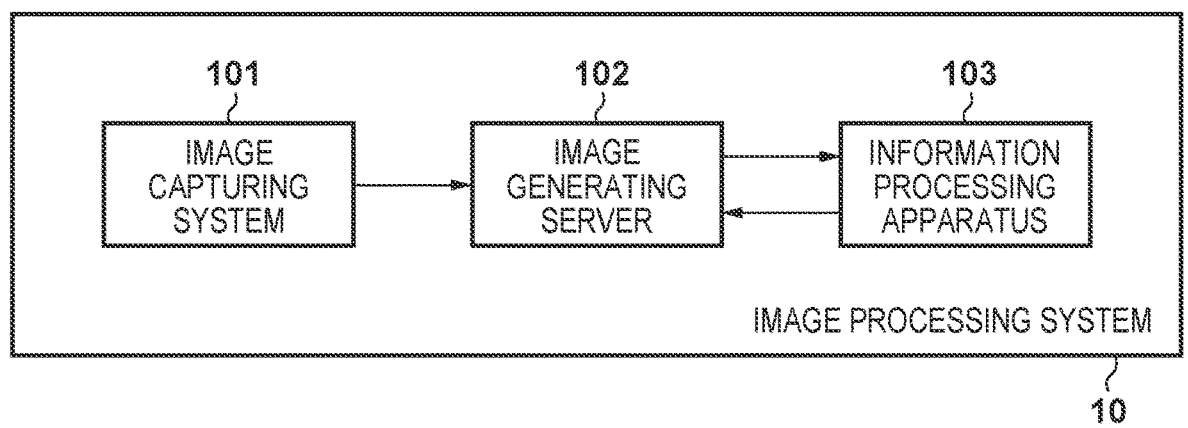
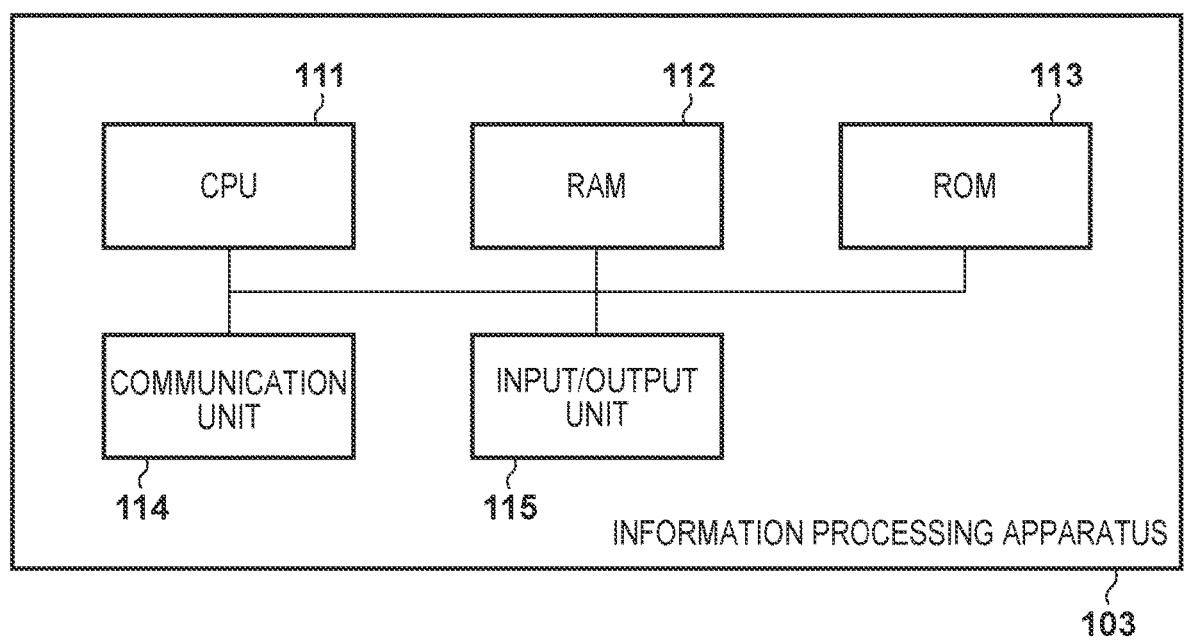

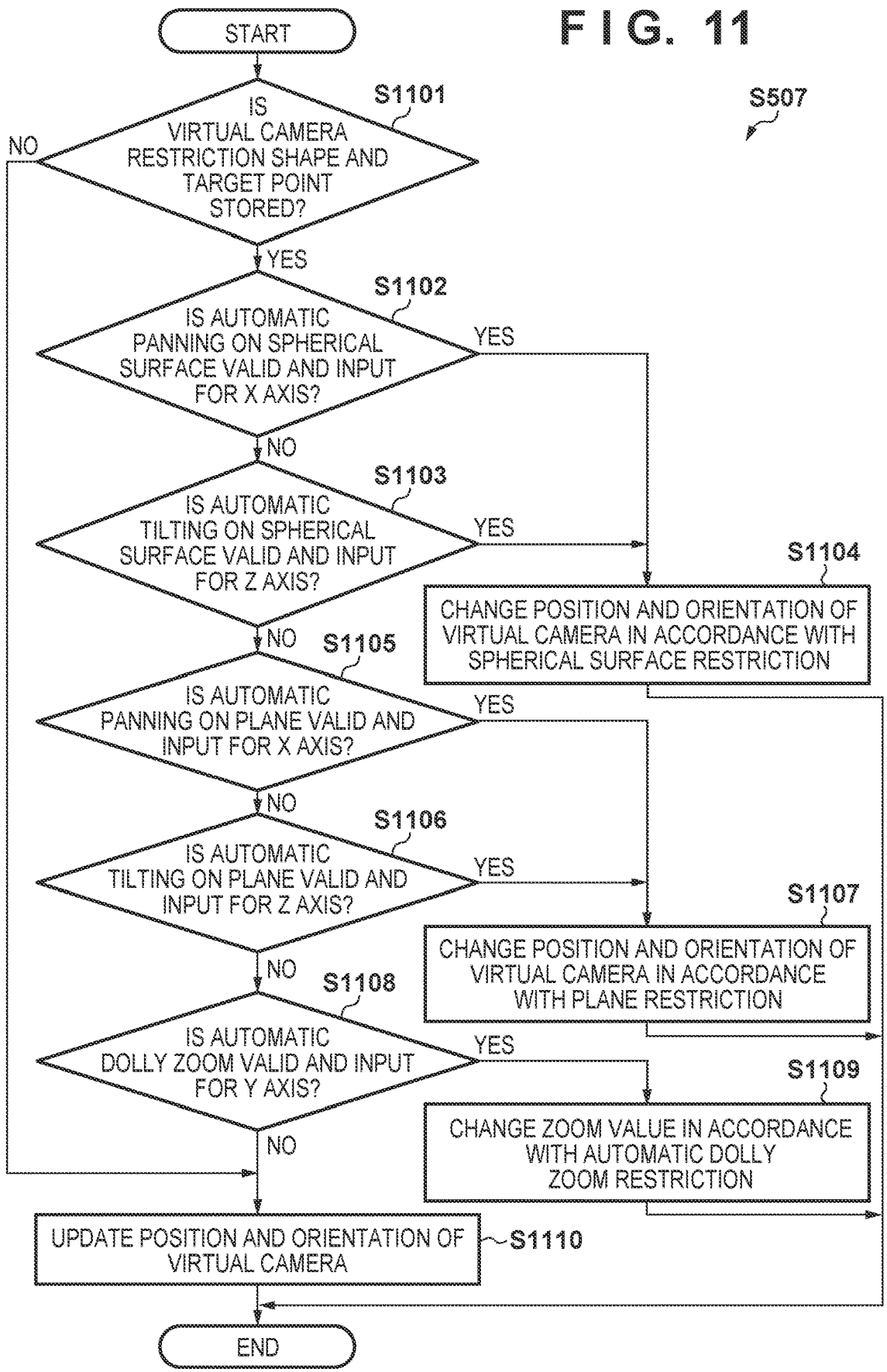

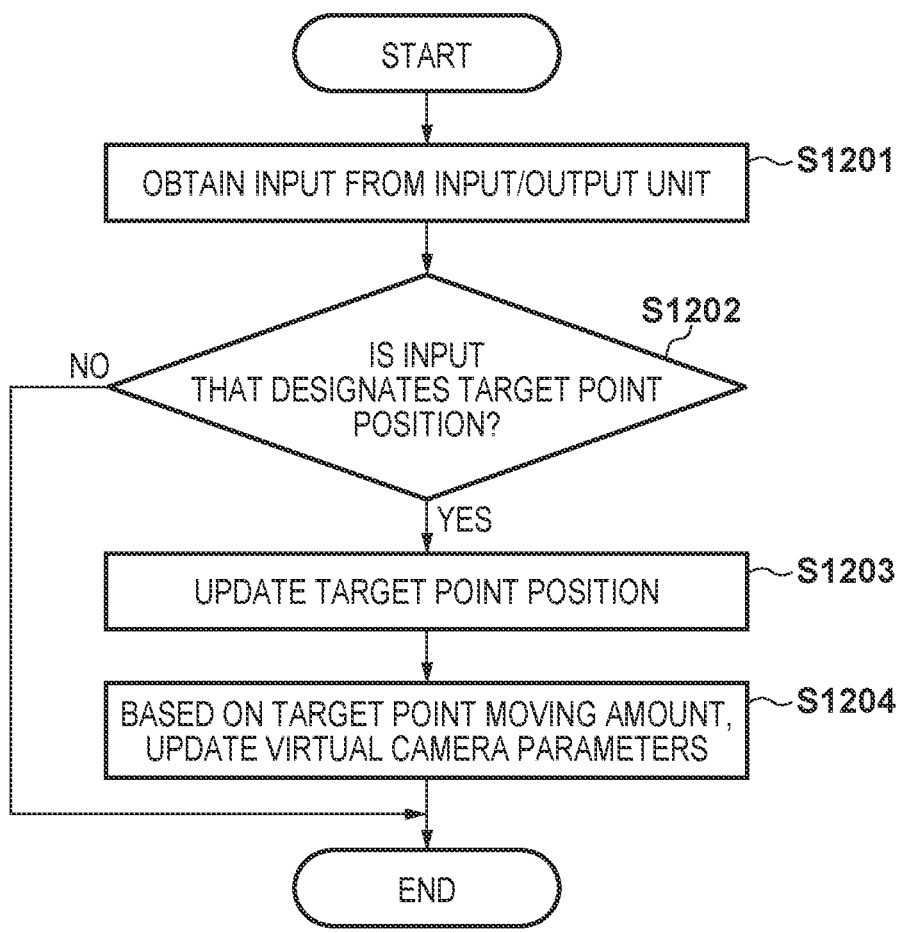

INFORMATION PROCESSING APPARATUS, CONTROL METHOD, AND STORAGE MEDIUM FOR CONTROLLING A VIRTUAL VIEWPOINT OF A VIRTUAL VIEWPOINT IMAGE

BACKGROUND OF THE INVENTION

Field of the Invention

The present invention relates to an information processing apparatus and a control method thereof for performing an operation to designate a virtual viewpoint.

Description of the Related Art

In recent years, a technique of performing multi-viewpoint synchronous image capturing by installing a plurality of cameras in different positions and using a plurality of viewpoint images obtained by the image capturing operation to generate not only images from the camera installation positions but also a virtual viewpoint image formed from an arbitrary viewpoint is gaining attention. The generation and viewing of a virtual viewpoint image based on a plurality of viewpoint images can be implemented by causing an image processing unit such as a server to compile images captured by a plurality of cameras, performing processing such as rendering based on a virtual viewpoint in the image processing unit, and displaying the obtained virtual viewpoint image on a user terminal. A service using a virtual viewpoint image allows a video producer to produce an impactful viewpoint content from, for example, images capturing a soccer game or a basketball game. In addition, it also allows a user who is the viewer of the content to watch the game by freely moving his/her viewpoint, and provides a more true-to-life viewing experience for the user.

Japanese Patent Laid-Open No. 2007-195091 discloses a technique that allows, when a user who is viewing the content is to move the virtual viewpoint, settings to be made so the user cannot move the virtual viewpoint to a position where it is undesirable to move the viewpoint or make the virtual viewpoint face an undesirable direction. The restrictions applied to the position and the direction of the virtual viewpoint are determined in advance by a content provider, and the contents of the restrictions are provided by being included in the content.

The technique disclosed in Japanese Patent Laid-Open No. 2007-195091 allows restrictions to be applied to the position and the viewpoint of a virtual viewpoint. However, whether the position and the viewpoint of the virtual viewpoint are to be restricted is set in advance by the content provider. That is, the video producer cannot control whether to allow the position and the viewpoint of the virtual viewpoint to be freely changed or to restrict the position and the viewpoint.

SUMMARY OF THE INVENTION

According to one aspect of the present invention, there is provided an information processing apparatus configured to output a parameter related to a virtual viewpoint which is used for generating a virtual viewpoint image based on a plurality of images captured by a plurality of cameras, the information processing apparatus comprising: a reception unit configured to receive an input according to a user operation; a determination unit configured to determine, based on an input according to a second user operation received by the reception unit, whether to apply a predetermined restriction to determination of a parameter which is based on an input according to a first user operation received by the reception unit; and an output unit configured to output, if the determination unit determines that the predetermined restriction should be applied, the parameter determined based on the predetermined restriction and the input according to the first user operation received by the reception unit.

According to another aspect of the present invention, there is provided a control method of an information processing apparatus configured to output a parameter related to a virtual viewpoint which is used for generating a virtual viewpoint image based on a plurality of images captured by a plurality of cameras, the method comprising: receiving an input according to a first user operation; receiving an input according to a second user operation; determining, based on the input according to the received second user operation, whether to apply a predetermined restriction to determination of a parameter, which is based on the input according to the first user operation; and outputting the parameter determined based on the predetermined restriction and the input according to the received first user operation if it is determined that the predetermined restriction should be applied.

According to another aspect of the present invention, there is provided a non-transitory computer-readable storage medium storing a program to cause a computer to execute a control method for outputting a parameter related to a virtual viewpoint which is used for generating a virtual viewpoint image based on a plurality of images captured by a plurality of cameras, the method comprising: receiving an input according to a first user operation; receiving an input according to a second user operation; determining, based on the input according to the received second user operation, whether to apply a predetermined restriction to determination of a parameter, which is based on the input according to the first user operation; and outputting the parameter determined based on the predetermined restriction and the input according to the received first user operation if it is determined that the predetermined restriction should be applied.

Further features of the present invention will become apparent from the following description of exemplary embodiments with reference to the attached drawings.

BRIEF DESCRIPTION OF THE DRAWINGS

FIG. 1A is a block diagram showing an example of the arrangement of an image processing system according to the first embodiment;

FIG. 1B is a block diagram showing an example of the hardware arrangement of an information processing apparatus;

FIG. 11 is a flowchart showing processing to change the parameters of the virtual camera:

FIG. 12 is a flowchart showing processing to move the target point in accordance with the input of a user;

DESCRIPTION OF THE EMBODIMENTS

Figure 2:
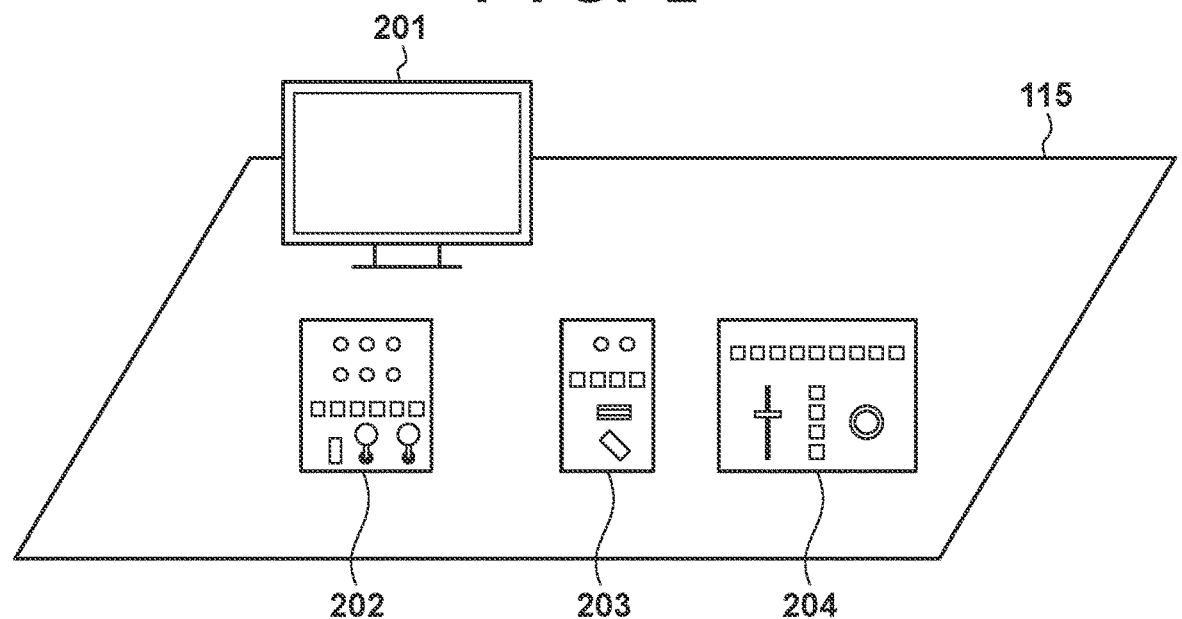
FIG. 2 is a view for explaining an input/output unit of the information processing apparatus.

Embodiments of the present invention will be described hereinafter with reference to the accompanying drawings.

A video producer needs to designate the position and the direction of a virtual viewpoint that is suitable for showing a scene of a game, more specifically, for showing the scene as an impactful image in accordance with the movement of a player or a ball. In such a situation, the video producer may want to freely change the position and the direction of the virtual viewpoint in accordance with each scene in some cases and may want to change the position and the direction of the virtual viewpoint in accordance with a restriction in other cases. In a case in which the position and the direction of the virtual viewpoint is to be changed in accordance with a restriction, for example, the position of the virtual viewpoint may be moved in accordance with the line of a stadium or the direction of the viewpoint may be changed so that the virtual viewpoint will constantly face a specific player. In an information processing apparatus to be described below, it is possible to perform an operation under a non-restricted state in which the position and the direction of a virtual viewpoint can be freely changed and an operation under a restricted state in which changes to the position and the direction of a virtual viewpoint are restricted so that the position and the direction of the viewpoint of the virtual camera will constantly satisfy an applied restriction.

First Embodiment

FIG. 1A is a block diagram showing an example of the arrangement of an image processing system 10 according to the first embodiment. The image processing system 10 includes an image capturing system 101, an image generating server 102, and an information processing apparatus 103. The image processing system 10 can generate a virtual viewpoint image. The image capturing system 101 performs synchronous image capturing by using a plurality of cameras arranged at different positions, and obtains a plurality of images from multiple viewpoints. The plurality of images obtained from multiple viewpoints by synchronous image capturing are transmitted to the image generating server 102. The image generating server 102 generates a virtual viewpoint image viewed from a virtual camera based on the plurality of images transmitted from the image capturing system 101. A virtual camera is a virtual camera that can freely move within an image capturing space. The image generating server 102 can generate an image, that is, a virtual viewpoint image seen from a viewpoint different from that of any camera belonging to the image capturing system 101. The viewpoint of the virtual camera is expressed by camera parameters of the virtual camera determined by the information processing apparatus 103.

The image generating server 102 can generate a virtual viewpoint image sequentially from the plurality of images which it receives, that is, the image generating server can generate a live virtual viewpoint image. Note that the live virtual viewpoint image that can be generated by the image processing system 10 is a virtual viewpoint image based on images captured by the image capturing system 101 at a time determined in consideration of the processing delay in the image capturing system 101 and image generating server 102 with respect to the current time. In addition, the image generating server 102 includes a database and has a function of storing the plurality of images received from the image capturing system 101. Hence, the image generating server 102 can generate a past virtual viewpoint image, that is, a replay virtual viewpoint image from the plurality of stored images. A replay virtual viewpoint image is a virtual viewpoint image based on images captured by the image capturing system 101 at an arbitrary time. Note that unless stated otherwise, the word "image" used in the description hereinafter includes both the concept of a moving image and the concept of a still image. That is, the image processing system 10 can process a still image and a moving image.

The information processing apparatus 103 provides parameters for generating a virtual viewpoint image from the plurality of images captured by the plurality of cameras. That is, the information processing apparatus 103 controls the virtual camera and determines the camera parameters representing the viewpoint of the virtual camera. The camera parameters of the virtual camera include at least one of parameters for designating the position, the orientation (direction), and the zoom. The camera parameters of the virtual camera may include a parameter for designating the time. The position of the virtual camera designated by the camera parameters may be a position indicating a set of three-dimensional coordinates. In addition, a position designated by the camera parameters of the virtual camera may be indicated by the respective coordinates of X-, Y-, and Z-axes of a three-axis Cartesian coordinate system (world coordinate system). In this case, a position designated by the camera parameters of the virtual camera is a position indicating the set of coordinates and may be formed from parameters of three axes, that is, the X-axis, the Y-axis, and the Z-axis. Note that an arbitrary position in the image capturing space may be set as the origin.

The orientation of the virtual camera designated by the camera parameters can be indicated by an angle formed by three axes of pan, tilt, and roll. In this case, the orientation of the virtual camera designated by camera parameters may be formed from parameters of three axes which are pan, tilt, and roll. The zoom of the virtual camera designated by the camera parameters is indicated by, for example, the focal distance as one axis, and the zoom and the time each are defined as a parameter of one axis. Hence, the camera parameters of the virtual camera include at least parameters of eight axes. The information processing apparatus 103 can control these eight axes. Note that the camera parameters may include parameters defining other elements and may not include all of the above-described parameters of eight axes.

The information processing apparatus 103 transmits the determined camera parameters of the virtual camera to the image generating server 102. Next, the image generating server 102 generates a virtual viewpoint image based on the received camera parameters and transmits the generated virtual viewpoint image to the information processing apparatus 103. The information processing apparatus 103 subsequently displays the received virtual viewpoint image in a camera view. Note that it may be arranged so that a live virtual viewpoint image and a replay virtual viewpoint image will be generated by one image generating server 102 in the manner of this embodiment or it may be arranged so that the live virtual viewpoint image and the replay virtual viewpoint image will be generated in different apparatuses by preparing two image generating servers 102. In addition, the information processing apparatus 103 and the image generating server 102 may be formed integrally.

FIG. 1B is a block diagram showing an example of the hardware arrangement of the information processing apparatus 103. A CPU 111 controls the overall information processing apparatus 103 by using data and computer programs stored in a RAM 112 and/or a ROM 113. The RAM 112 is a memory that can be read- and write-accessed as needed. The RAM 112 temporarily stores a computer program that has been read out from the ROM 113, midway results of a calculation by the CPU 111, data supplied from the outside via a communication unit 114, and the like. The ROM 113 is a read-only memory and holds, for example, computer programs and data that need not be changed. The communication unit 114 includes a communication unit such as the Ethernet, a USB, or the like and communicates with the image generating server 102. An input/output unit 115 includes a controller for controlling the virtual camera and a display unit for displaying the state of the virtual camera.

FIG. 2 is a view for explaining the input/output unit 115 of the information processing apparatus 103. A display unit 201 displays a camera view window. The camera view window is a window for displaying a virtual viewpoint image received from the image generating server 102. The display unit 201 also displays a pilot window. The pilot window is a window for controlling the virtual camera. The display unit 201 also displays a replay window. The replay window is a window for generating and editing a replay virtual viewpoint image.

The input/output unit 115 includes three controllers. The input/output unit 115 receives an instruction input to control the virtual camera in accordance with the operations made by the user on these controllers. That is, the input/output unit 115 receives a user operation to change the position, the orientation, and the like of the virtual camera. A six-axis controller 202 is a controller that can operate the six axes of the virtual camera. Arbitrary control can be assigned to each axis via the setting. For example, the joysticks of the six-axis controller 202 can be used to control the X-axis, the Y-axis, and the Z-axis which are the three axes for designating the position of the virtual camera and to control pan, tilt, and roll which are the three axes for designating the orientation of the virtual camera. A zoom controller 203 is a controller for controlling the zoom of the virtual camera. A replay controller 204 is a controller for controlling the function of generating a replay virtual viewpoint image. The replay controller 204 also controls the time of the virtual camera.

Note that the input/output unit 115 shown in FIG. 2 is merely an example and may have an arrangement which includes a plurality of the display units 201. In addition, the input/output unit 115 may have an arrangement which includes two or less or four or more controllers. Furthermore, the input/output unit 115 may include a pointing device. In this case, the user can use the pointing device to select a GUI component included in a window displayed on the display unit 201. The display unit 201 may also have a touch panel function. In this case, the user can touch the display unit 201 to select a GUI component included in the window displayed on the display unit 201.

Figure 3:
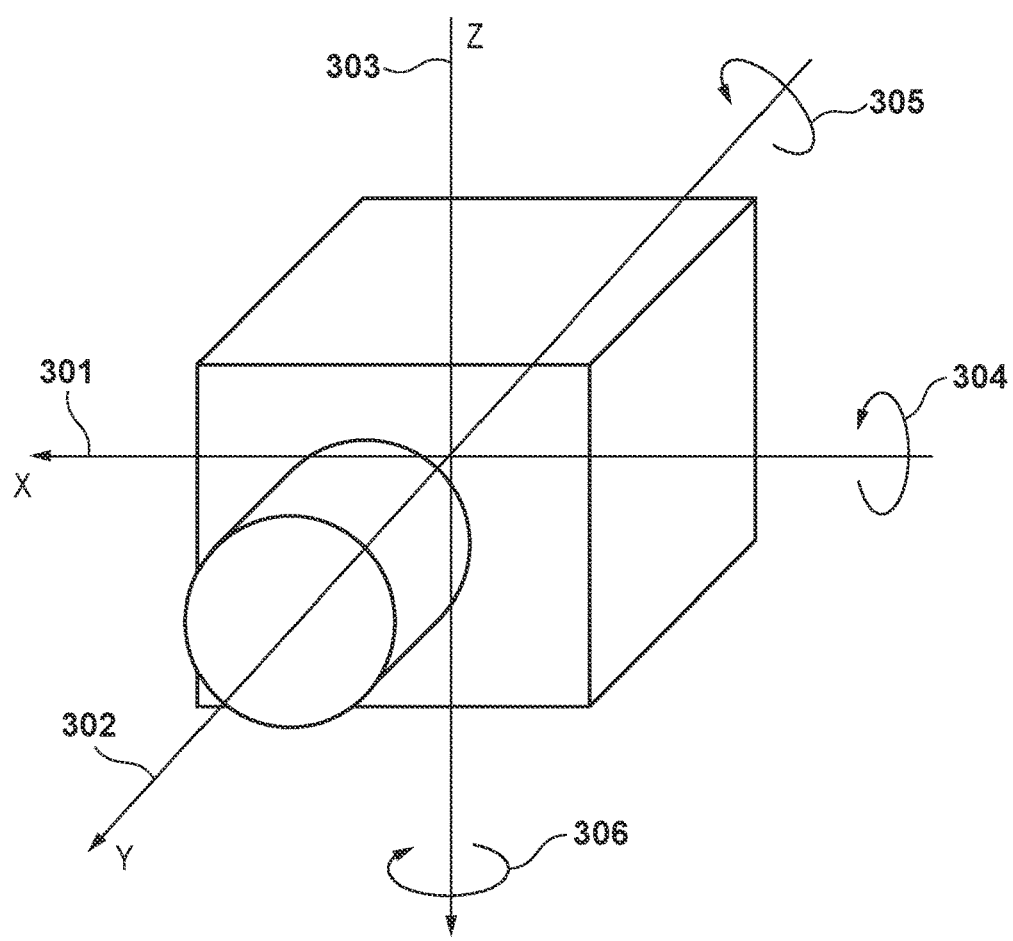
FIG. 3 is a view for explaining the camera parameters of a virtual camera according to the first embodiment.

FIG. 3 is a view for explaining the camera parameters of the virtual camera according to this embodiment. The camera parameters of the virtual camera indicate the position of the virtual camera based on the coordinates of the origin of a three-axis Cartesian coordinate system (camera coordinate system) formed by an X-axis 301 indicating a horizontal direction, a Y-axis 302 indicating a front-and-rear direction, and a Z-axis 303 indicating a vertical direction in the world coordinate system. In addition, the camera parameters indicate the orientation of the virtual camera based on an angle formed by pan 306 which is the rotation about the Z-axis 303, tilt 304 which is the rotation about the X-axis 301, and roll 305 which is a rotation about the Y-axis 302.

Figure 4:
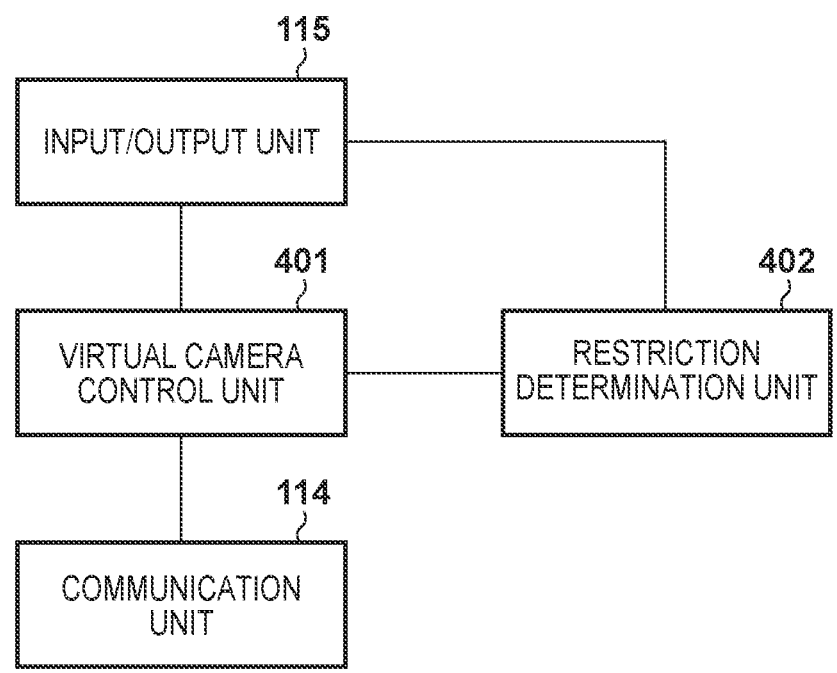
FIG. 4 is a block diagram showing an example of the functional arrangement of the information processing apparatus according to the first embodiment.

FIG. 4 is a block diagram showing an example of the functional arrangement implemented by the CPU 111 executing a computer program according to the first embodiment. A virtual camera control unit 401 updates the parameters of the virtual camera upon receiving an input made by a user operation to control the virtual camera from the input/output unit 115. The virtual camera control unit 401 transmits the updated parameters of the virtual camera to the image generating server 102 via the communication unit 114. Upon receiving the input made by user operation with respect to the virtual camera from the input/output unit 115, a restriction determination unit 402 switches the validation and invalidation of the restriction (whether to apply the restriction) on the virtual camera and determines the contents of the restriction. If the virtual camera restriction is valid, the virtual camera control unit 401 updates the parameters of the virtual camera to satisfy this restriction.

Figure 5:
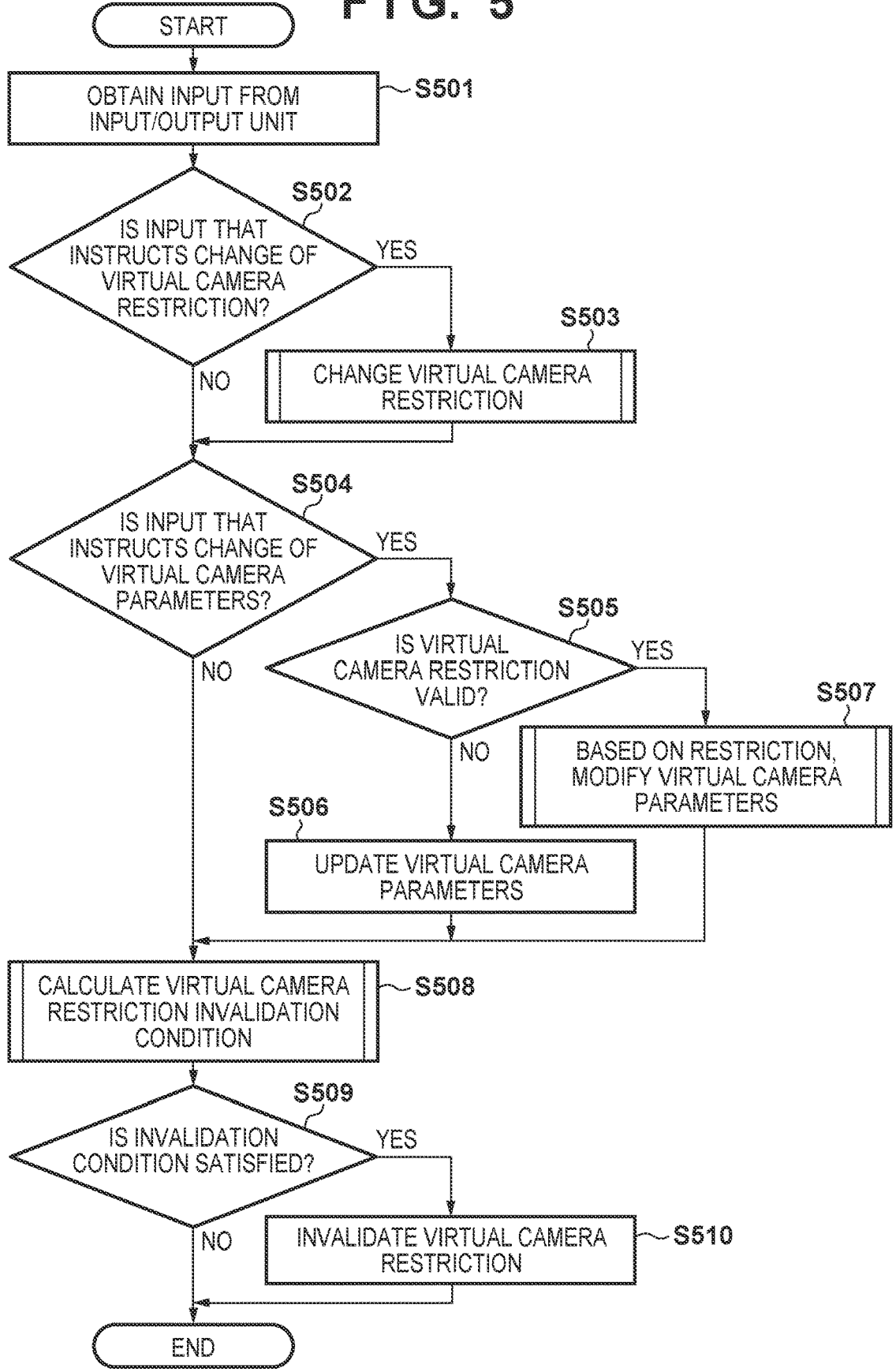
FIG. 5 is a flowchart showing the processing performed by a virtual camera control unit and a restriction determination unit.

FIG. 5 is a flowchart showing the procedure of processing performed by the virtual camera control unit 401 and the restriction determination unit 402 shown in FIG. 3. This processing will be executed periodically.

First, the virtual camera control unit 401 and the restriction determination unit 402 receive information input by the user from the input/output unit 115 (step S501). The restriction determination unit 402 determines whether the input information received in step S501 is an instruction to change the restriction applied to the virtual camera (step S502). If it is determined that the input information is an instruction to change the restriction on the virtual camera (YES in step S502), the restriction determination unit 402 changes the restriction on the virtual camera (step S503), and the process advances to step S504. Note that the processing to change the restriction on the virtual camera will be described later with reference to FIG. 7. On the other hand, if it is determined that the input information is not an instruction to change the restriction on the virtual camera (NO in step S502), the process advances to step S504.

The virtual camera control unit 401 determines whether the input information received in step S501 is an instruction to change the parameters of the virtual camera (step S504). If it is determined that the input information is an instruction to change the parameters of the virtual camera (YES in step S504), the restriction determination unit 402 will determine whether the restriction on the virtual camera is valid (step S505). If it is determined that the restriction on the virtual camera is valid (YES in step S505), the virtual camera control unit 401 will change the parameters of the virtual camera based on the input information received in step S501 and the valid restriction on the virtual camera (step S507). Processing performed to change the parameters of the virtual camera by using the restriction on the virtual camera will be described later with reference to FIG. 11. If the restriction on the virtual camera is determined to be invalid (NO in step S505), the virtual camera control unit 401 will change the parameters of the virtual camera based on the input information (step S506). If it is determined in step S504 that the input information is not an instruction to change the parameters of the virtual camera, the process advances to step S508 after the completion of the process of step S506 or step S507.

The restriction determination unit 402 calculates (step S508) the invalidation condition of the restriction on the virtual camera and determines (step S509) whether the invalidation condition is satisfied. If it is determined that the invalidation condition is satisfied (YES in step S509), the restriction determination unit 402 invalidates the restriction on the virtual camera (step S510). The processing ends if it is determined in step S509 that the invalidation condition is not satisfied or after the restriction on the virtual camera has been invalidated in step S510, the processing ends. The invalidation condition calculation processing (step S508) will be described later with reference to the flowchart of FIG. 10.

Figure 6A:
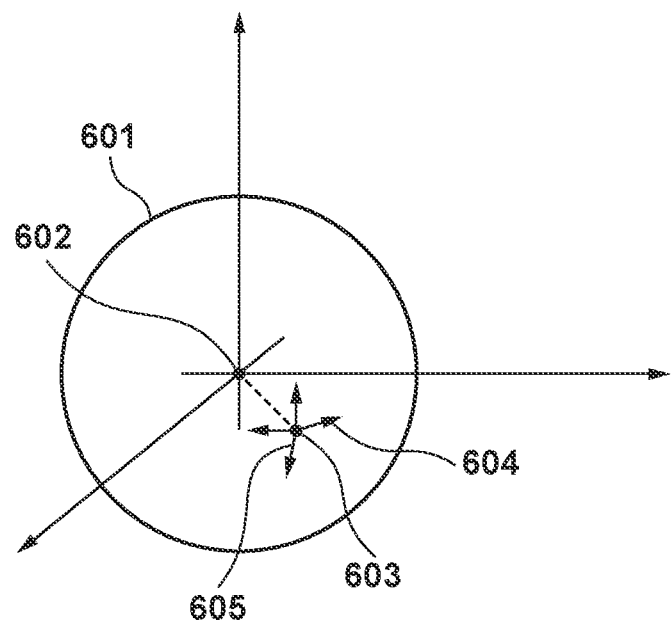
FIG. 6A is a view for explaining automatic panning on a spherical surface and "automatic tilting on the spherical surface"
Figure 6C:
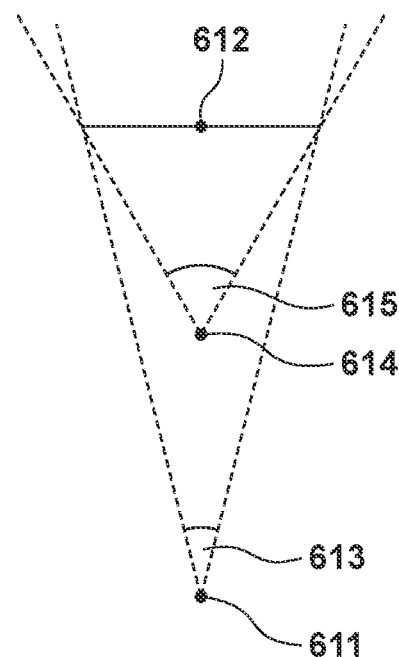
FIG. 6C is a view for explaining "automatic dolly zoom"
Figure 6B:
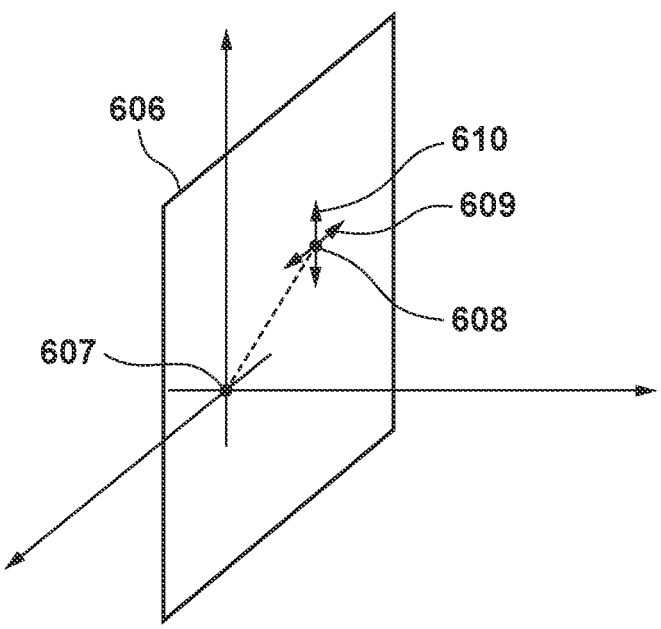
FIG. 6B is a view for explaining the automatic panning on a plane and "automatic tilting on the plane"

The restriction on the virtual camera will be described next. FIGS. 6A to 6C are views for explaining the restrictions applied on the virtual camera according to the first embodiment. The restriction determination unit 402 includes five kinds of virtual camera restrictions. That is, the restriction determination unit includes five kinds of restrictions which are "automatic panning on the spherical surface", "automatic tilting on the spherical surface", "automatic panning on the plane", "automatic tilting on the plane", and "automatic dolly zoom".

First, the "automatic panning on the spherical surface" and the "automatic tilting on the spherical surface" will be described with reference to FIG. 6A. These restrictions will use a virtual spherical surface 601 in the three-dimensional space. When these restrictions are validated, a position 603 of the virtual camera will be restricted to the surface of the virtual spherical surface 601. Also, the direction (orientation) of the virtual camera will be restricted so as to constantly face a direction passing a target point 602 which is the center of the virtual spherical surface 601. The "automatic panning on the spherical surface" applies the above-described restriction to the movement of the virtual camera in the X-axis direction, and makes the virtual camera move along a path 604 on the surface of the virtual spherical surface 601. The "automatic tilting on the spherical surface" applies the above-described restriction on the movement of the virtual camera in the Z-axis direction, and makes the virtual camera move along a path 605 on the surface of the virtual spherical surface 601.

The "automatic panning on the plane" and the "automatic tilting on the plane" will be described next with reference to FIG. 6B. A virtual plane 606 existing in a three-dimensional space will be used for these restrictions. When these restrictions are validated, a position 608 of the virtual camera will be restricted to the plane of the virtual plane 606. The direction (orientation) of the virtual camera will be restricted so as to constantly face a direction passing a target point 607. Note that the target point 607 will be described later with reference to FIGS. 9A to 9C. The "automatic panning on the plane" applies the above-described restriction to the movement of the virtual camera along the X-axis. A path 609 indicates the movement along the X-axis. The "automatic tilting on the plane" applies the above-described restriction to the movement of the virtual camera along the Z-axis. A path 610 indicates the movement along the Z-axis.

The "automatic dolly zoom" will be described next with reference to FIG. 6C. The dolly zoom is an image capturing technique in which zooming in and zooming out are simultaneously performed by changing the distance between the virtual camera and an object included in a capturing region of at least one of the plurality of cameras included in the image capturing system 101 to maintain the size of the object in the virtual viewpoint image in the same size. The "automatic dolly zoom" is a restriction applied to maintain the size of the object positioned at the target point by changing the zoom of the virtual camera when the distance between a position 611 of the virtual camera and a dream zoom target point 612 is changed. An angle 613 of view indicates the angle of view shown by a zoom value set before the distance is changed (when the virtual camera is at the position 611). A position 614 indicates a position of the virtual camera after the distance has changed. An angle 615 of view is an angle of view indicated by the zoom value after the distance has changed. The zoom value indicating the angle 615 of view is determined automatically based on the "automatic dolly zoom" restriction.

Figure 7:
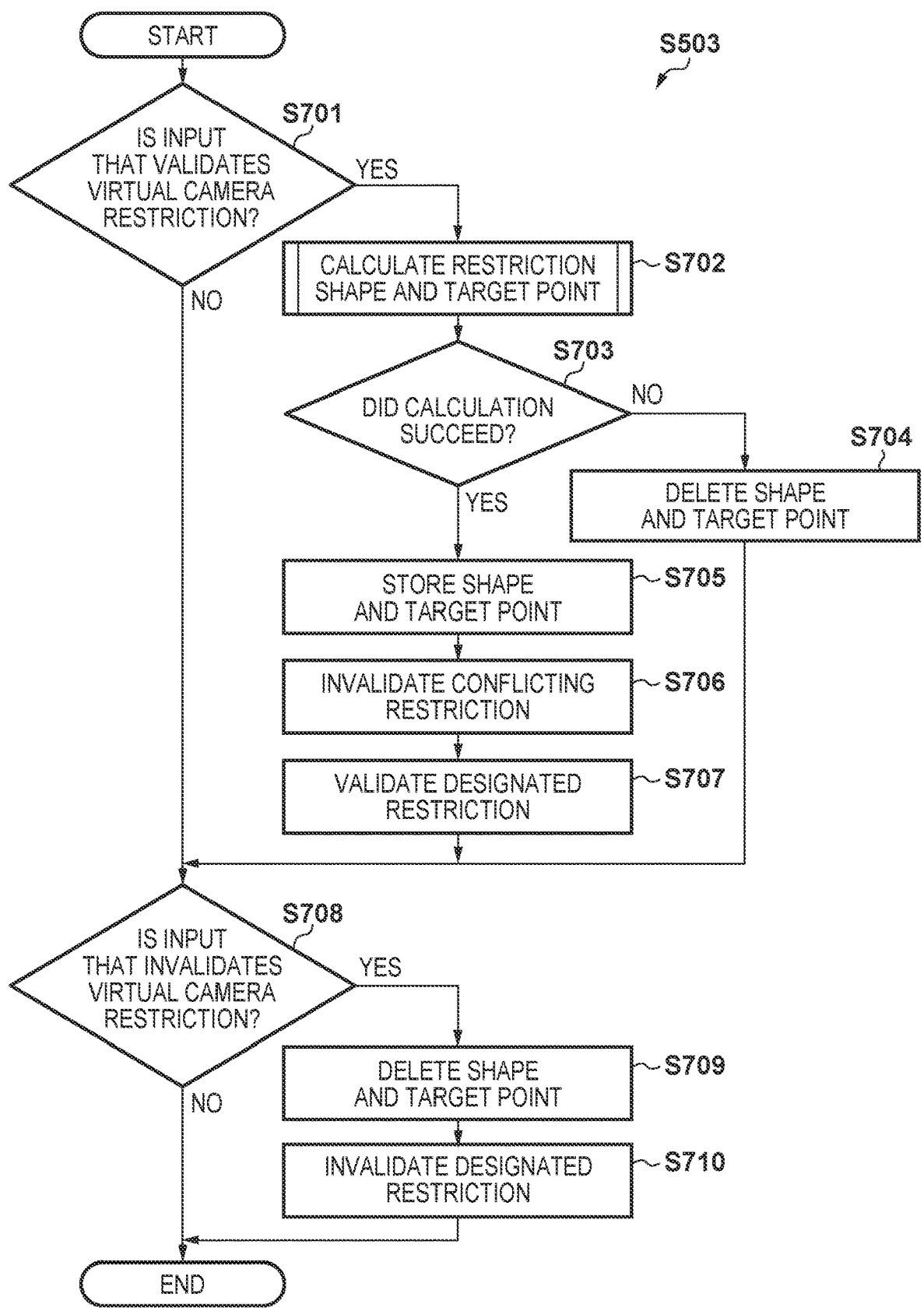
FIG. 7 is a flowchart showing processing performed to change a restriction applied to a virtual camera.

FIG. 7 is a flowchart showing the details of processing (step S503 of FIG. 5) performed to change the restriction applied on the virtual camera.

The restriction determination unit 402 determines whether input information from the input/output unit 115 is an input to validate one of the five restrictions (the "automatic panning on the spherical surface", the "automatic tilting on the spherical surface", the "automatic panning on the plane", the "automatic tilting on the plane", and the "automatic dolly zoom") described above (step S701). The arrangement of the input/output unit 115 for switching the validation/invalidation of the restriction will be described later with reference to FIGS. 8A and 8B. If it is determined that the input is a validation input (YES in step S701), the restriction determination unit 402 will calculate the shape and the target point to apply the virtual camera restriction (step S702). The restriction determination unit 402 determines whether the calculation of the shape and the target point has succeeded (step S703). If it is determined that the calculation has failed (NO in step S703), the restriction determination unit 402 will delete the shape and the target point stored in the RAM 112 (step S704). Subsequently, the process will advance to step S708. On the other hand, if it is determined that the calculation has succeeded (YES in step S703), the restriction determination unit 402 will store the calculated shape and target point in the RAM 112 (step S705). Subsequently, the restriction determination unit 402 will invalidate each restriction that cannot be held simultaneously with the restriction designated by the input information, that is, the restriction determination unit will invalidate each restriction that will conflict with the designated restriction (step S706). For example, in a case in which the "automatic panning on the plane" or the "automatic tilting on the plane" is valid when an instruction to validate the "automatic tilting on the spherical surface" is received, the "automatic panning on the plane" and the "automatic tilting on the plane" are invalidated. The restriction determination unit 402 validates the restriction designated by the input information (step S707), and the process advances to step S708. Note that the calculation of the target point will be described later with reference to FIGS. 9A to 9C.

Next, the restriction determination unit 402 determines whether the input information from the input/output unit 115 is an input to invalidate one of the five restrictions described above (step S708). If it is determined that the input information is an invalidation input (YES in step S708), the restriction determination unit 402 will delete (step S709) the shape and the target point stored in the RAM 112 and invalidate (step S710) the designated restriction.

The process (processing to invalidate a conflicting restriction) of step S706 will be described in detail. In this embodiment, if there is an instruction to validate the "automatic panning on the spherical surface" or the "automatic tilting on the spherical surface", both the "automatic panning on the plane" and the "automatic tilting on the plane" will be invalidated. Also, if there is an instruction to validate the "automatic panning on the plane" or the "automatic tilting on the plane", both the "automatic panning on the spherical surface" and the "automatic tilting on the spherical surface" will be invalidated.

Figure 8A:
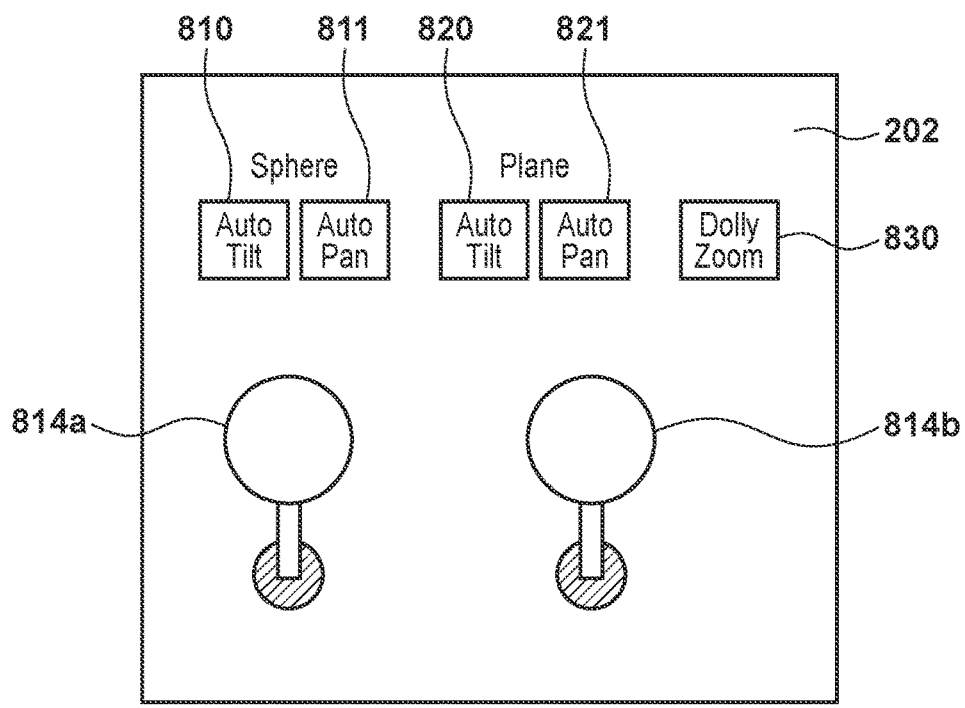
FIGS. 8A and 8B are views each showing an example of a virtual camera restriction validation/invalidation instruction method.

FIG. 8A is a view showing an example of a method for instructing the validation and invalidation of each restriction applied on the virtual camera. The six-axis controller 202 has functions to change the parameters of the virtual camera and to instruct the validation and the invalidation of each restriction applied on the virtual camera. The six-axis controller 202 includes five buttons 810, 811, 820, 821, and 830 for switching between validation and invalidation of the respective types of restrictions, and two three-axis joysticks 814a and 814b for changing the position and the direction of the virtual viewpoint. The six-axis controller 202 can control six axes. The units and the functions of the six-axis controller 202 according to the embodiment will be described hereinafter.

The three-axis joystick 814a is assigned to control three axes which are the X-, Y-, and Z-axes, and the other three-axis joystick 814b is assigned to control three axes which are pan, tilt, and roll. In the case of the three-axis joystick 814a, the movement in the X-axis direction is assigned to a horizontal tilting operation, the movement in the Z-axis direction is assigned to a front-and-rear tilting operation, and the movement in the Y-axis direction is assigned to a twisting operation about the shaft of the stick. Also, in the case of the three-axis joystick 814b, pan is assigned to the horizontal tilting operation, tilt is assigned to the front-and-rear tilting operation, and roll is assigned to the twisting operation about the shaft of the stick. A switch to validate/invalidate the "automatic panning on the spherical surface" is assigned to the button 810. A switch to validate/invalidate the "automatic tilting on the spherical surface" is assigned to the button 811. A switch to validate/invalidate the "automatic panning on the plane" is assigned to the button 820. A switch to validate/invalidate the "automatic tilting on the plane" is assigned to the button 821. A switch to validate/invalidate the "automatic dolly zoom" is assigned to the button 830.

Figure 8B:
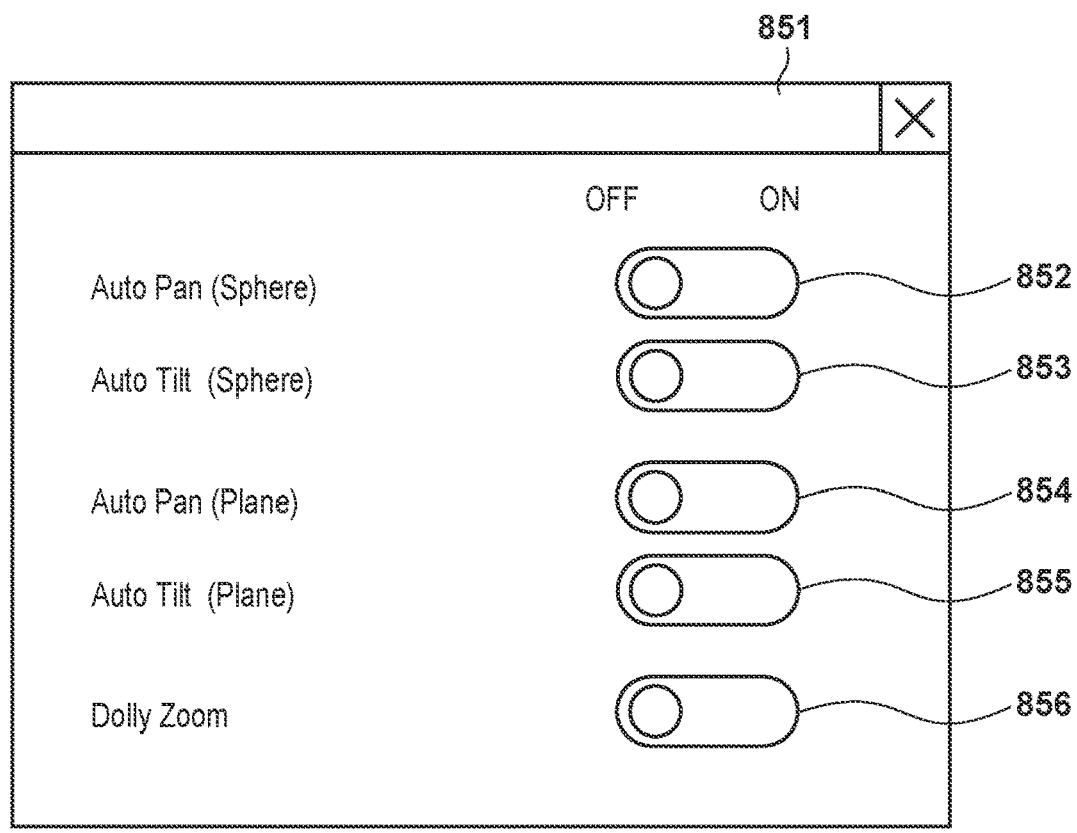

FIG. 8B is a view showing another example of the method for instructing the validation and invalidation of each restriction applied on the virtual camera. A window 851 is displayed on the display unit 201 and has the function of designating whether to validate/invalidate each restriction applied to the virtual camera. In a case in which the input/output unit 115 includes a pointing device and a touch panel, the user can use these devices to select GUI components 852 to 856 displayed on the window 851. In this case, the GUI component 852 has a function of switching the state of the "automatic panning on the spherical surface" between a valid state and an invalid state. The GUI component 853 has a function of switching the state of the "automatic tilting on the spherical surface" between the valid state and the invalid state. The GUI component 854 has the function of switching the state of the "automatic panning on the plane" between the valid state and the invalid state. The GUI component 855 has the function of switching the state of the "automatic tilting on the plane" between the valid state and the invalid state. The GUI component 856 has the function of switching the state of the "automatic dolly zoom" between the valid state and the invalid state.

Figure 9A:
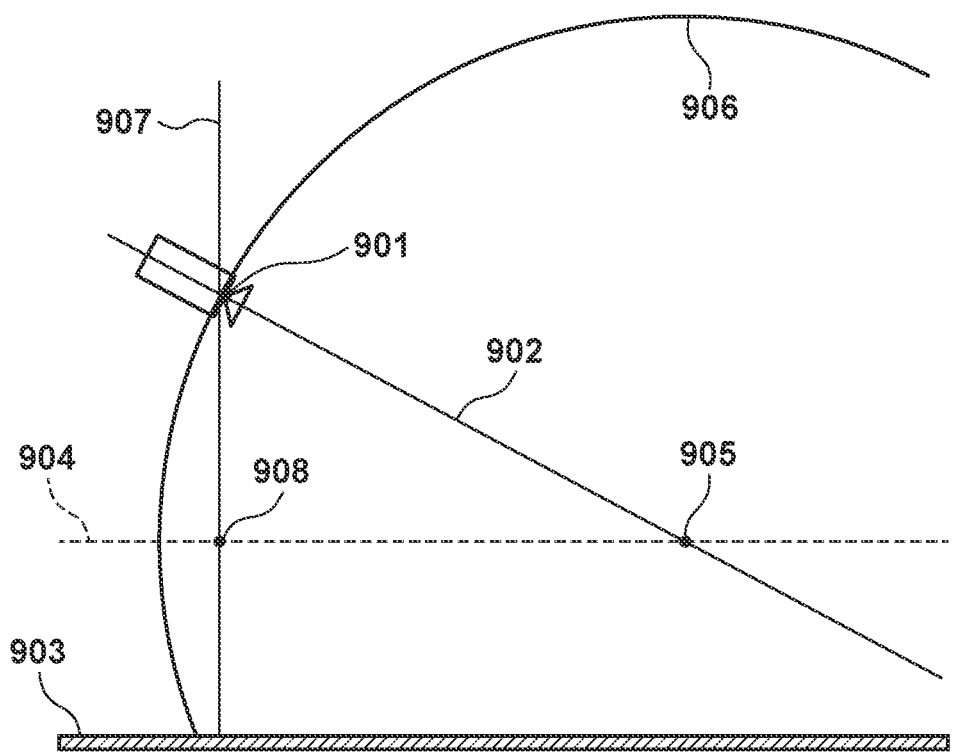
FIG. 9A is a view showing processing performed by the restriction determination unit to calculate a target point and a shape of the restriction.

FIG. 9A is a view showing the details of the processing performed in step S702 by the restriction determination unit 402 to calculate the target point and the shape of each restriction. FIG. 9A shows a state in which the position and the orientation of the virtual camera and the ground surface are seen from the side. In FIG. 9A, reference numeral 901 denotes the position of the virtual camera. Reference numeral 902 denotes the direction faced by the virtual camera, that is, the optical axis of the virtual camera. Reference numeral 903 denotes the ground surface. Assume that a surface 904 parallel to the ground surface and is set at a specific height from the ground surface 903 is defined, and that a position where the optical axis 902 of the virtual camera and the surface 904 intersect is defined as a target point 905. Note that the height of the surface 904 from the ground surface 903 may be determined in advance or may be set by the user.

In a case in which the restriction validated in step S701 is the "automatic panning on the spherical surface" or the "automatic tilting on the spherical surface", the virtual spherical surface 601 will be defined as a sphere centered about the target point 905 and having the distance from the target point 905 to the position 901 of the virtual camera as the radius. The shape of the restriction will be the value of this radius. Also, in a case in which the restriction validated in step S701 is the "automatic panning on the plane" or the "automatic tilting on the plane", the virtual plane 606 will be defined as a plane 907 passing the position 901 of the virtual camera. At this time, when a point 908 is defined as the foot of the perpendicular line from the position 901 of the virtual camera to the surface 904, the plane 907 will be a plane perpendicular to a vector from the point 908 to the target point 905. The shape of the restriction is set by an expression representing this plane. If the target point 905 exists toward the front (the side of the image capturing direction) when viewed from the virtual camera, it will be determined that the calculation of the target point has succeeded. On the other hand, if the target point 905 exists toward the rear when viewed from the virtual camera or if the optical axis 902 of the virtual camera and the surface 904 are parallel to each other and do not intersect, it will be determined that the calculation of the target point has failed.

Figure 9B:
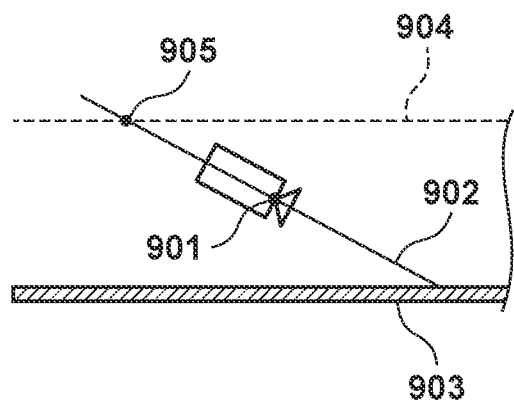
FIGS. 9B and 9C are views each showing an example in a case in which the target point exists behind the virtual camera.
Figure 9C:
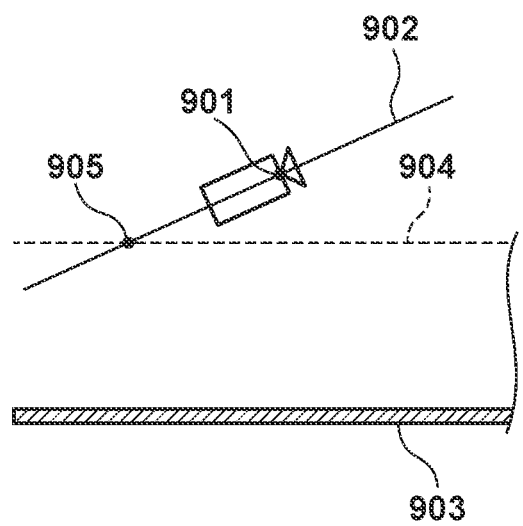
Figure 10:
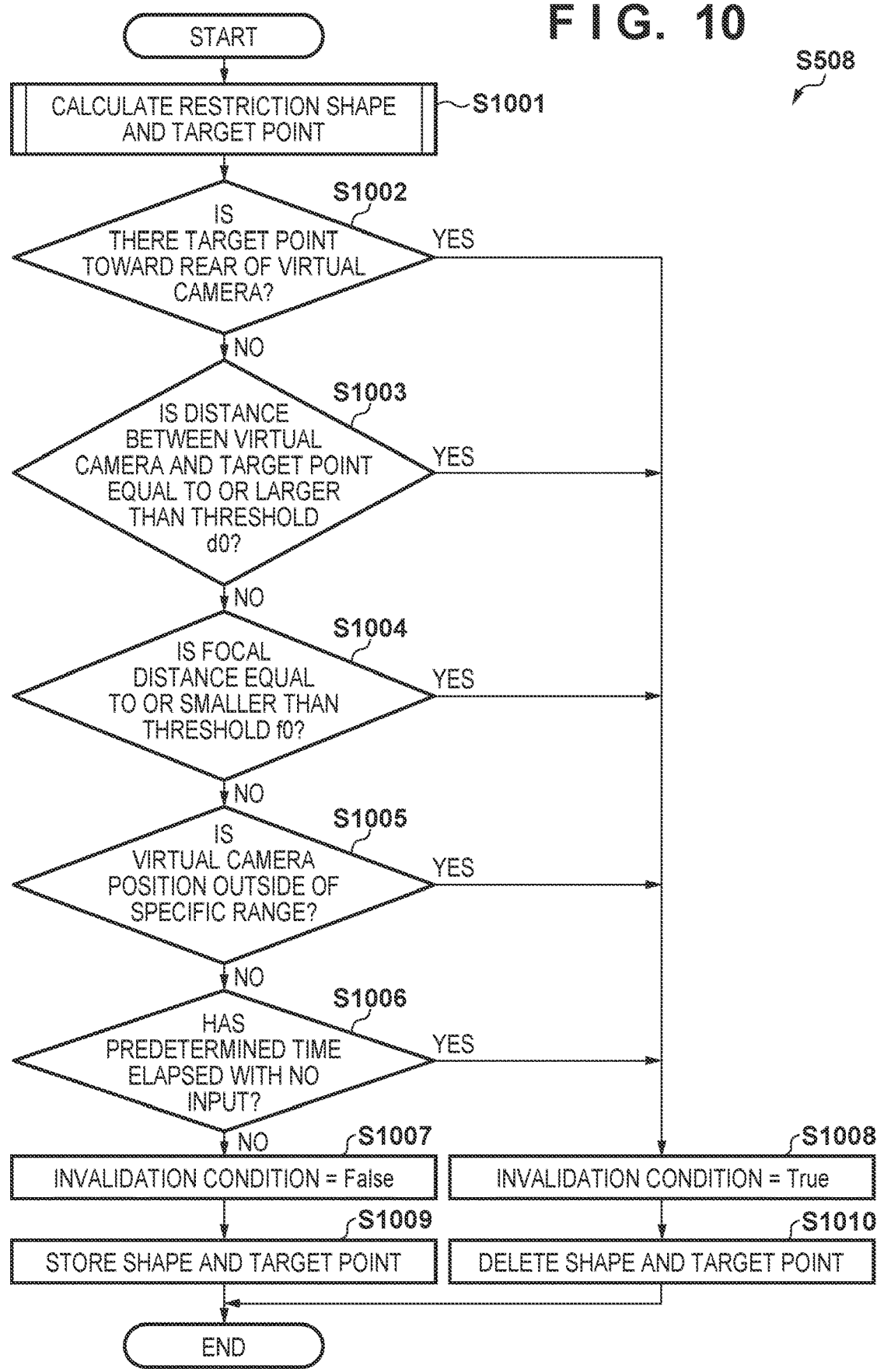
FIG. 10 is a flowchart showing processing for calculating an invalidation condition of each restriction applied to the virtual camera.

FIG. 10 is a flowchart illustrating the details of the processing for calculating an invalidation condition of each restriction applied to the virtual camera shown in step S508. The restriction determination unit 402 calculates the target point and shape of the restriction applied to the virtual camera (step S1001). This process is the same as the process shown in step S702. The restriction determination unit 402 determines whether the target point calculated in step S1001 exists toward the rear (side on the direction opposite to the image capturing direction) of the virtual camera (step S1002). If it is determined that the target point exists toward the rear of the virtual camera (YES in step S1002), the invalidation condition of the restriction applied to the virtual camera will be set to "True" (step S1008). Examples of a case in which the target point exists towards the rear of the virtual camera are shown by FIGS. 9B and 9C. In FIG. 9B, since the position 901 of the virtual camera is lower than the height of the surface 904 and since the orientation of the virtual camera is facing the ground surface 903, the target point 905 is positioned toward the rear of the virtual camera. In FIG. 9C, since the position 901 of the virtual camera is higher than the height of the surface 904 and since the orientation of the virtual camera is not facing the ground surface 903, the target point 905 is positioned toward the rear of the virtual camera.

The restriction determination unit 402 determines whether the distance between the virtual camera and the target point calculated in step S1001 is equal to or more than a threshold d0 (step S1003). If it is determined that the distance is equal to or more than the threshold d0 (YES in step S1003), the restriction determination unit 402 sets the restriction invalidation condition of the virtual camera to "True" (step S1008). The threshold d0 is defined by, for example, the breadth of the stadium. For example, if control is performed so that the virtual camera will constantly face a specific player or ball, the distance to the target point will not be a value equal to or larger than a predetermined value, that is, the distance will not exceed, for example, the breadth of the stadium. Hence, if the distance to the target point exceeds the breadth of the stadium, the restriction determination unit 402 will invalidate the restriction applied to the virtual camera.

The restriction determination unit 402 determines whether the current focal distance of the virtual camera is equal to or less than a threshold f0 (step S1004). If it is determined that the current focal distance is equal to or less than the threshold f0 (YES in step S1004), the restriction determination unit 402 will set the invalidation condition of the restriction applied to the virtual camera to "True" (step S1008). For example, if the "automatic dolly zoom" restriction is in a valid state, the focal distance decreases as the virtual camera becomes closer to the target point, and the angle of view increases as a result. Since a wide angle of view will distort the peripheral portions of an image, an image unsuitable for viewing may be produced. Hence, if the focal distance is equal to or less than a predetermined value, the restriction determination unit 402 will invalidate the restriction applied to the virtual camera.

The restriction determination unit 402 determines whether the current position of the virtual camera exists outside a specific range (step S1005). If the current position exists outside the specific range (YES in step S1005), the restriction determination unit 402 will set the invalidation condition of the restriction applied to the virtual camera to "True" (step S1008). The specific range is set, for example, at position higher than the ground surface. Therefore, since the position of the camera will fall outside the specific range if the position of the virtual camera reaches the ground surface due to user operation, the restriction determination unit 402 will invalidate the restriction applied to the virtual camera. In addition, the restriction determination unit 402 will determine whether a predetermined time has elapsed in a state without an input from the input/output unit 115 (step S1006). If it is determined that the predetermined time has elapsed (YES in step S1006), the invalidation condition of the restriction applied to the virtual camera will be set to "True" (step S1008).

After the invalidation condition of the restriction applied to the virtual camera is set to "True" in step S1008, the restriction determination unit 402 deletes the target point and the shape of the restriction of the virtual camera from the RAM 112 (step S1010). On the other hand, if all of the conditions of the processes from step S1002 to S1006 are not satisfied, the restriction determination unit 402 will set the invalidation condition of the restriction applied to the virtual camera to "False" (step S1007). Subsequently, the restriction determination unit 402 stores the target point and the shape of the virtual camera calculated in step S1001 in the RAM 112 (step S1009). In this manner, the contents of the validated restriction are determined based on at least one of the position and the direction of the virtual viewpoint at the point when the restriction is validated.

FIG. 11 is a flowchart showing the details of processing executed in step S507 of FIG. 5 to change the parameters of the virtual camera based on the restriction applied to the virtual camera and the input from the input/output unit 115. This processing is executed with respect to an instruction input (for example, operation made by using the three-axis joysticks 814a and 814b) to change the axes of the virtual camera which is obtained from the input/output unit 115 by the virtual camera control unit 401.

The virtual camera control unit 401 determines whether the pieces of information of the target point and the shape of the virtual camera restriction are stored in the RAM 112 (step S1101). If the pieces of information are stored (YES in step S1101), the process will advance to step S1102 and onward, and the camera parameters of the virtual camera are controlled under each currently set restriction. In a case in which it is determined that the "automatic panning on the spherical surface" is valid and the input from the input/output unit 115 is an X-axis input (YES in step S1102), the virtual camera control unit 401 updates the position and the orientation of the virtual camera (step S1104). More specifically, the restriction determination unit 402 first updates the position of the virtual camera based on the input, draws a straight line connecting the updated position to the target point 602 of the virtual spherical surface 601, and sets a point where this straight line and the virtual spherical surface 601 intersect as the new position of the virtual camera. The restriction determination unit 402 then updates the orientation of the virtual camera so that the optical axis of the virtual camera will pass through the target point 602 of the virtual spherical surface 601. In a case in which it is determined that the "automatic tilting on the spherical surface" is valid and the input from the input/output unit 115 is a Z-axis input (YES in step S1103), the virtual camera control unit 401 will update the position and the orientation of the virtual camera under the automatic tilting restriction on the spherical surface (step S1104). The details of the process (the updating of the position and the orientation of the virtual camera under the "automatic tilting on the spherical surface" restriction) in step S1104 are the same as the updating of the position and the orientation of the virtual camera under the "automatic panning on the spherical surface" restriction as described above.

If "NO" is determined in steps S1102 and S1103, the process will advance to step S1105 and onward. In a case in which it is determined that the "automatic panning on the plane" is valid and the input from the input/output unit 115 is the X-axis input (YES in step S1105), the virtual camera control unit 401 will update the position and the orientation of the virtual camera under the "automatic panning on the plane" restriction (step S1107). More specifically, the restriction determination unit 402 first updates the position of the virtual camera based on the input, draws a straight line connecting the updated position to the target point 607 of the virtual plane, and sets a point where this straight line and the virtual plane 606 intersect as the new position of the virtual camera. The restriction determination unit 402 also updates the orientation of the virtual camera so that the optical axis of the virtual camera will pass through the target point 607 of the virtual plane. In a case in which it is determined that the "automatic tilting on the plane" is valid and the input from the input/output unit 115 is the Z-axis input (YES in step S1106), the virtual camera control unit 401 will update the position and the orientation of the virtual camera (step S1107). The details of the process (the updating of the position and the orientation of the virtual camera under the "automatic tilting on the plane" restriction) in step S1107 are the same as the updating of the position and the orientation of the virtual camera under the "automatic panning on the plane" restriction as described above.

The virtual camera control unit 401 determines whether the "automatic dolly zoom" is valid and the input from the input/output unit 115 is a Y-axis input (step S1108). If the determination result is "YES" (YES in step S1108), the virtual camera control unit 401 updates the zoom of the virtual camera (step S1109). More specifically, the restriction determination unit 402 updates the position of the virtual camera based on the Y-axis input and updates the zoom value in accordance with the changed position. For example, the updating of the zoom value can be performed as follows. Let d be a distance between the dolly zoom target point 612 and the position 611 of the virtual camera before the update, d' be a distance between the dolly zoom target point 612 and the position 614 of the virtual camera after the update, and f be a value of the focal distance representing the zoom of the virtual camera. In this case, the restriction determination unit 402 sets a value f as the new zoom value of the virtual camera which is calculated by $$f' = \frac{fd'}{d} \quad (1)$$

In a case in which the target point and the restriction applied on the camera are not stored in the RAM 112 (NO in step S1101) or in a case in which the input information and the restriction applied to the virtual camera do not satisfy any of the conditions described above in steps S1102 to S1108, the process advances to step S1110. In this case, the virtual camera control unit 401 will update the position and the orientation of the virtual camera based on the input information (step S1110).

The process of step S1110 will be described. In a case in which an input unrelated to the restriction of the virtual camera is made, the target point and the shape of the restriction applied to the virtual camera are changed based on the input in the process shown in step S1110. For example, an input related to the "automatic panning on the spherical surface" is the X-axis input. If the "automatic panning on the spherical surface" restriction is valid and an input to change the Y-axis is made, the Y-axis value of the virtual camera will be changed in step S1110. Subsequently, the target point and the shape of the restriction will be calculated again in step S1001. As a result, the radius of a spherical surface 906 which is to be used for the "automatic panning on the spherical surface" restriction is changed. This changed radius is stored in the RAM 112 in step S1009.

Note that if the focal distance becomes equal to or less than a predetermined value as a result of the "automatic dolly zoom", the virtual camera control unit 401 will ignore such a change in the Y value. For example, this change will be ignored because the focal distance will change to a negative value if the Y value increases and exceeds the target point. In addition, the periphery of the image will become increasingly distorted as the focal distance becomes shorter and the angle of view becomes wider. Hence, it may be set so that the virtual camera control unit 401 will ignore a change which sets the focal distance to be a predetermined value or less. Furthermore, in a case in which it is set so that one of the automatic panning restriction and the auto tilting restriction is valid and while the other is invalid, the virtual camera control unit may ignore an axis input related to the invalid restriction. For example, if the "automatic panning on the spherical surface" is valid and the "automatic tilting on the spherical surface" is invalid, it may be set so that the virtual camera control unit will ignore the Z-axis input.

FIG. 12 is a flowchart showing an example processing in which the target point of the restriction applied to the virtual camera is moved in accordance with the user input. For example, in a scene where an object such as a sports player moves, the object can be continuously captured so that it will be at the center of the virtual viewpoint image by moving the target point of the restriction applied to the virtual camera in accordance with the moving object. This processing is valid for such a situation. This processing is executed at predetermined time intervals.

The restriction determination unit 402 obtains the input information from the input/output unit 115 (step S1201). The restriction determination unit 402 determines whether the input information obtained in step S1201 designates the position of the target point (step S1202). If it is determined that the input information designates the position of the target point (YES in step S1202), the restriction determination unit 402 will update the position of the target point stored in the RAM 112 based on the input information (step S1203). The virtual camera control unit 401 updates the parameters of the virtual camera based on a position p0 of the target point before the update and a position p1 of the new target point updated in step S1203 (step S1204).

Figure 13A:
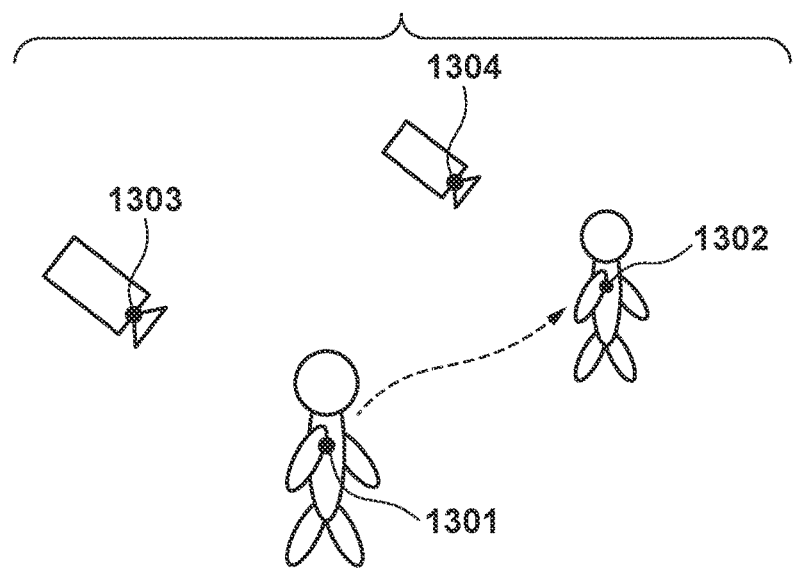
FIG. 13A is a view for explaining the operation performed to update the target point position and to move the virtual viewpoint.

FIG. 13A is a view for explaining the processing performed to update the position of the target point performed in S1203. A target point 1301 indicates the position p0 of the target point before the update, and a target point 1302 indicates the position p1 of the target point after the update. In addition, a position 1303 indicates the position of the virtual camera before the update, and a position 1304 indicates the position of the virtual camera updated in step S1204. The virtual camera control unit 401 calculates the new position 1304 of the virtual camera by adding an amount of positional change from the position p0 of the target point to the position p1 to the position 1303 of virtual camera, and updates the position of the virtual camera by this value. In step S1203, if the "automatic panning on the plane", the "automatic tilting on the plane", and the "automatic dolly zoom" are valid, the orientation of the virtual camera will be changed so that the virtual camera will face the position p1. In this case, the position of the virtual camera will remain unchanged at the position 1303 as shown.

Figure 13B:
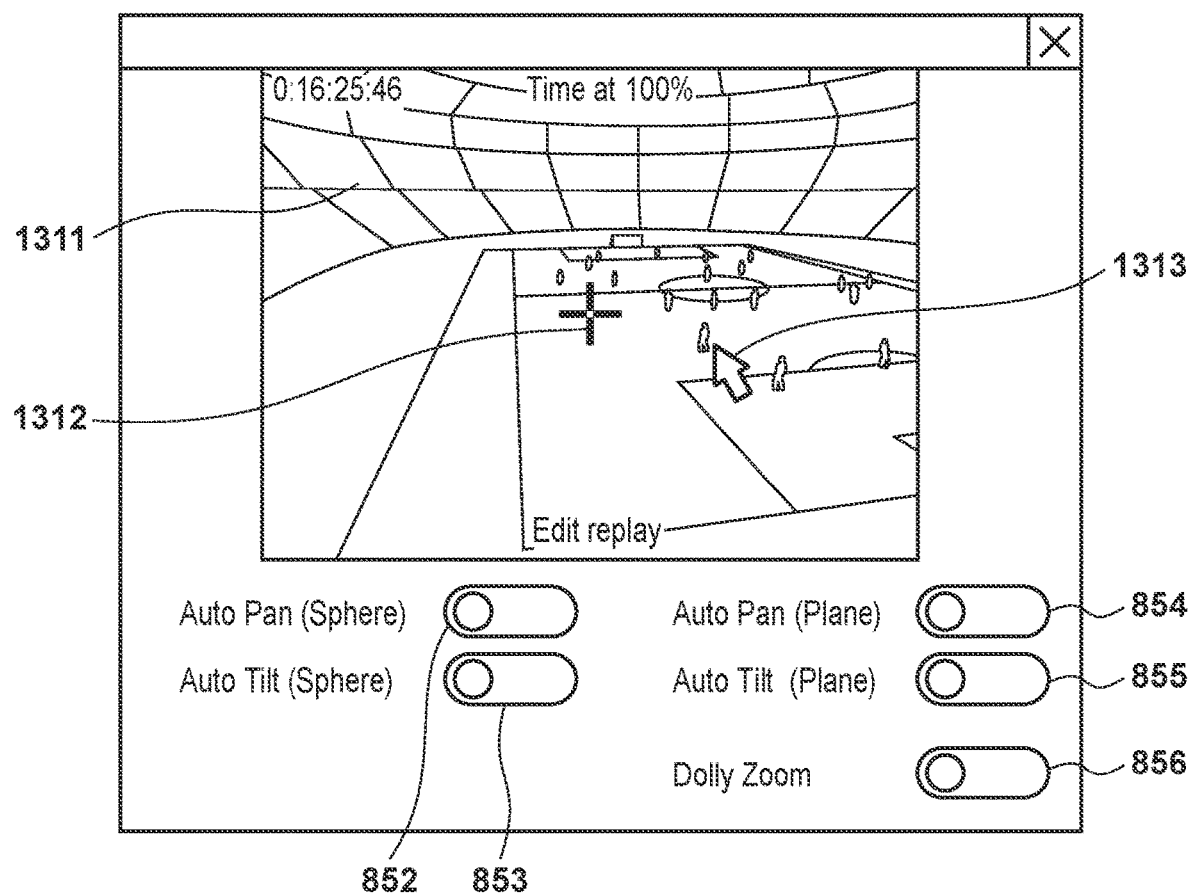
FIG. 13B is a view showing an example of a unit used by the user to designate the target point position where the virtual camera is to be restricted.

FIG. 13B is a view showing an example of a unit used by the user to designate the position of the target point of the restriction applied to the virtual camera. Reference numeral 1311 denotes a virtual viewpoint image displayed on the display unit 201. A marker 1312 indicates the current position of the target point in the virtual viewpoint image 1311. A cursor 1313 is operated by the pointing device included in the input/output unit 115. The user can drag and drop the marker 1312 to a different position in the virtual viewpoint image 1311 by using the pointing device to operate the cursor 1313 and designate the position as the new target point.

In this case, the restriction determination unit 402 will obtain a straight line 1 connecting the position of the virtual camera and the arbitrary position selected by the user. This straight line 1 is a straight line that passes through the position of the virtual camera and the point located at the following position when viewed from the virtual camera.

$$\left(\frac{X - p_x}{f_x}, \frac{Y - p_y}{f_y}, 1\right) \quad (2)$$

where X is an X-coordinate value in the virtual viewpoint image 1311 selected by the user, and Y is a Y-coordinate value in the virtual viewpoint image selected by the user. $f_x$, $f_y$, $p_x$, and $p_y$ are internal parameters obtained in a case in which the virtual camera is represented by a pinhole camera model. $f_x$ and $f_y$ represent the focal distance of the virtual camera, and the $p_x$ and $p_y$ represent the optical center of the lens included in the virtual camera. Assume that a position where the straight line 1 and the surface 904 intersect is the target point 905.

Note that when the user is to designate the target point of the restriction applied to the virtual camera by using the processing shown in FIG. 12, it may be set so that the virtual camera control unit 401 will not execute the processes shown in steps S1110, S1001, and S1009. These processes will change the target point and the restriction applied to the virtual camera when an input unrelated to each restriction applied to the virtual camera is made. For example, in a case in which it is determined that the "automatic panning on the spherical surface" restriction is valid and an input to change the Y-axis is made, the radius of the spherical surface 906 which is the restriction applied to the virtual camera is changed. These processes and the processing shown in FIG. 12 have the function of changing the target point based on the input. Hence, if the processing shown in FIG. 12 is to be executed, it may be set so that these processes will not be executed.

Note that although the marker 1312 is moved by a drag-and-drop operation in FIG. 13B, it may be moved by another operation. For example, the marker may be moved by placing the cursor 1313 in the virtual viewpoint image 1311 and making a clicking operation. Also, if the input/output unit 115 includes a touch panel, the user may move the marker 1312 by touching the touch panel.

Note that although the user can control the parameters of the virtual camera via the input/output unit 115 in the first embodiment, it may be set so that the parameters of the virtual viewpoint will be controlled by allowing the position and the orientation of the virtual viewpoint to be controlled. In this case, the virtual camera control unit 401 will be configured to control the virtual viewpoint, and the restriction determination unit 402 will be configured to determine the restriction applied to the virtual viewpoint. Note that although the "automatic dolly zoom" restriction will be unusable because the zoom cannot be controlled in this case, it is possible to use other restrictions. Additionally, if the input/output unit 115 receives an instruction to change the parameters of the virtual camera in a state in which a change to the position and the direction of the virtual viewpoint is restricted, a change made to the parameters of the virtual camera that is not in accordance with the restrictions may be ignored or may be corrected to a change made to the parameters of the virtual camera in accordance with the restrictions.

As described above, according to the first embodiment, the video producer can control each restriction applied to the position and the direction of the virtual viewpoint. This allows the video producer to both freely control the position and the direction of the virtual viewpoint and perform control under a state in which changes to the position and the direction of the virtual viewpoint are restricted. As a result, the video producer can control the virtual viewpoint by an appropriate method in accordance with the scene of the game.

Second Embodiment

As shown in FIGS. 9A to 9C, the first embodiment set the intersection point of the optical axis 902 of the virtual camera and the surface 904 as the target point 905 of the restriction applied to the virtual camera. However, the appropriate height of the surface 904 will vary in accordance with the situation. For example, although it is preferable for the height of the surface 904 to be set to 2 m when the object is positioned at a height of 2 m, it is preferable to set the height of the surface 904 to 50 cm when the object is positioned at the height of 50 cm. If the object is a person, the height can easily change depending on whether the person is an adult or a child or whether the person is standing or bending down. The first embodiment showed an arrangement in which the same height was constantly used or the height of the surface 904 was set manually by the user. An arrangement in which the height of the surface 904 needs to be manually changed increases the operational load for the user. In the second embodiment, the position of the target point will be calculated by using the distance information of the object viewed from the virtual camera.

Figure 14:
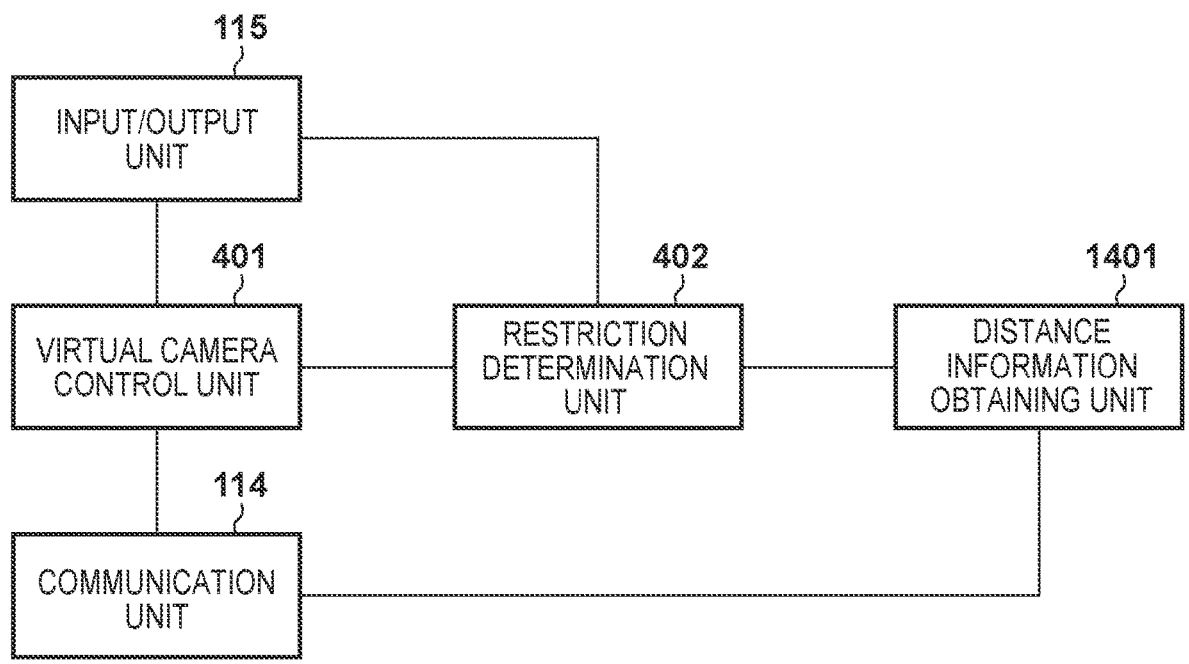
FIG. 14 is a block diagram showing an example of the functional arrangement of an information processing apparatus according to the second embodiment.

FIG. 14 is a block diagram showing an example of the functional arrangement of an information processing apparatus 103 according to the second embodiment. Each function shown in FIG. 14 can be implemented by, for example, a CPU 111 executing a predetermined computer program in the same manner as the first embodiment. The information processing apparatus 103 includes a distance information obtaining unit 1401 in addition to a virtual camera control unit 401 and a restriction determination unit 402. The distance information obtaining unit 1401 obtains distance information from an image generating server 102 via a communication unit 114.

In the second embodiment, the image generating server 102 reconstructs the three-dimensional shape of an object based on a plurality of images captured synchronously from multiple viewpoints. When a virtual camera image is to be generated, the image generating server 102 calculates the distance between the virtual camera and the object captured by the virtual camera based on this three-dimensional shape and the camera parameters of the virtual camera. Assume that this distance information is a distance image generated by using the same camera parameters as those of the virtual camera hereinafter. The distance information obtaining unit 1401 obtains this distance image from the image generating server 102 via the communication unit 114. Subsequently, the restriction determination unit 402 will calculate the position of the target point based on the distance image obtained by the distance information obtaining unit 1401.

Figure 15:
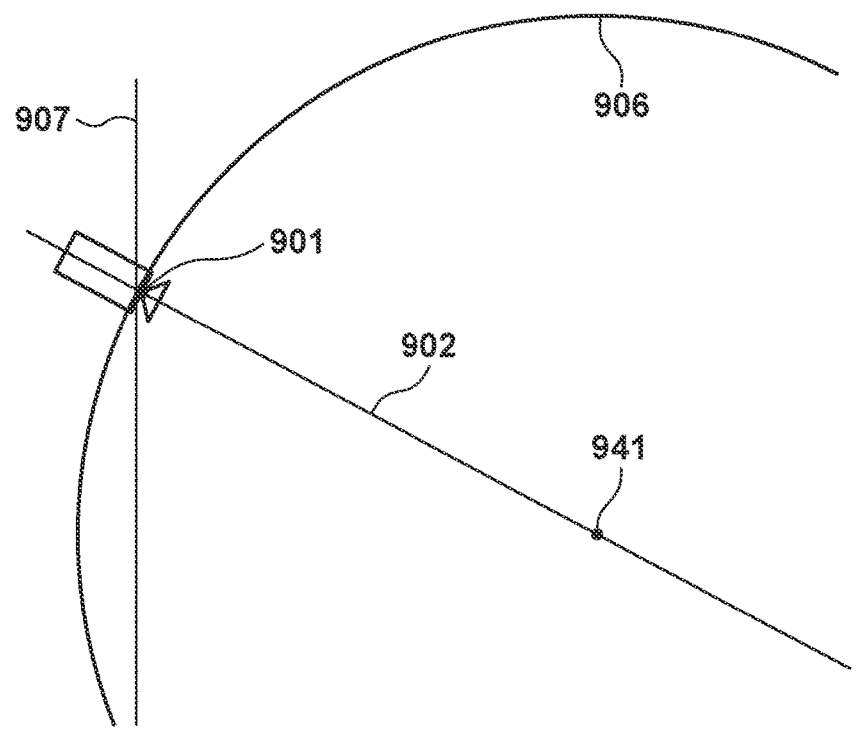
FIG. 15 is a view for explaining processing performed to calculate a restriction and a target point according to the second embodiment.

FIG. 15 is a view showing processing performed by the restriction determination unit 402 to calculate the target point and the shape of the restriction according to the second embodiment. This processing is executed in, for example, step S702. FIG. 15 shows the position, the orientation, and the target point of the virtual camera when it is viewed from the side. The restriction determination unit 402 uses the distance image obtained from the distance information obtaining unit 1401 to calculate the distance from a position 901 of the virtual camera to an object that has been captured at the center of the image by the virtual camera. Next, the restriction determination unit obtains a point 941 located at a position advanced from the position 901 of the virtual camera along an optical axis 902 of the virtual camera by this calculated distance. The restriction determination unit 402 uses the point 941 as a target point 602 of a virtual spherical surface 601, a target point 607 of a virtual plane 606, or a dolly zoom target point 612 in accordance with the validated restriction.

Note that although the image generating server 102 performs the processing to calculate the distance to the object based on the three-dimensional shape in the second embodiment, the present invention is not limited to this. For example, the distance information obtaining unit 1401 may calculate the distance to the object based on the three-dimensional shape or a plurality of synchronously captured images.

Third Embodiment

As described in FIGS. 12, 13A, and 13B, the first embodiment allowed the user to move the position of the target point that is to be used for camera parameter restriction. This operation is useful when, for example, the user wants to control the position of the virtual camera while capturing a player moving toward the center of the virtual camera image. However, in this case, the user will need to manually control the position of the target point in accordance with the movement of the player while he/she controls the position of the virtual camera simultaneously. An operation which requires the user to simultaneously move the two respective positions of the virtual camera and the target point in accordance with the scene places a large load on the user. In the third embodiment, the target point to be used for the restriction is determined automatically by using a unit for detecting the position of an object such as a player. The operational load will decrease since the user will not need to control the position of the target point.

Figure 16A:
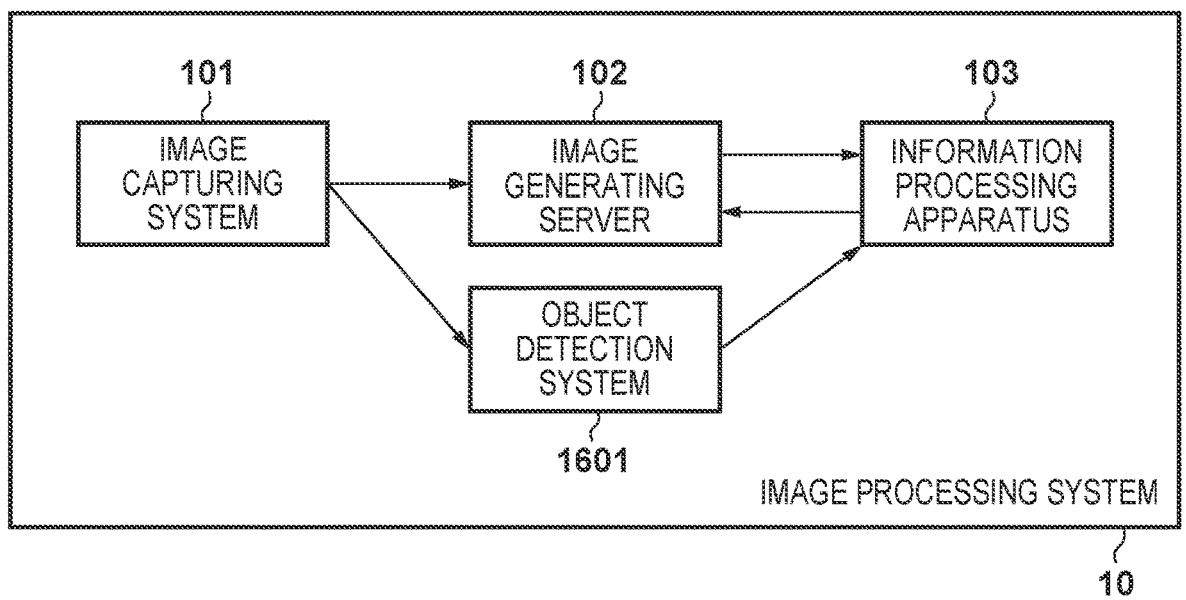
FIG. 16A is a block diagram for explaining the overall arrangement of an image processing system according to the third embodiment.

FIG. 16A is a block diagram for explaining the overall arrangement of an image processing system 10 according to the third embodiment. An object detection system 1601 detects the position of an object, for example, a sports player or a ball included in a plurality of images captured synchronously from multiple viewpoints by the image capturing system 101, and transmits the result of the detection to an information processing apparatus 103. Note that the object detection system 1601 may be incorporated in, for example, an image generating server 102.

Figure 16B:
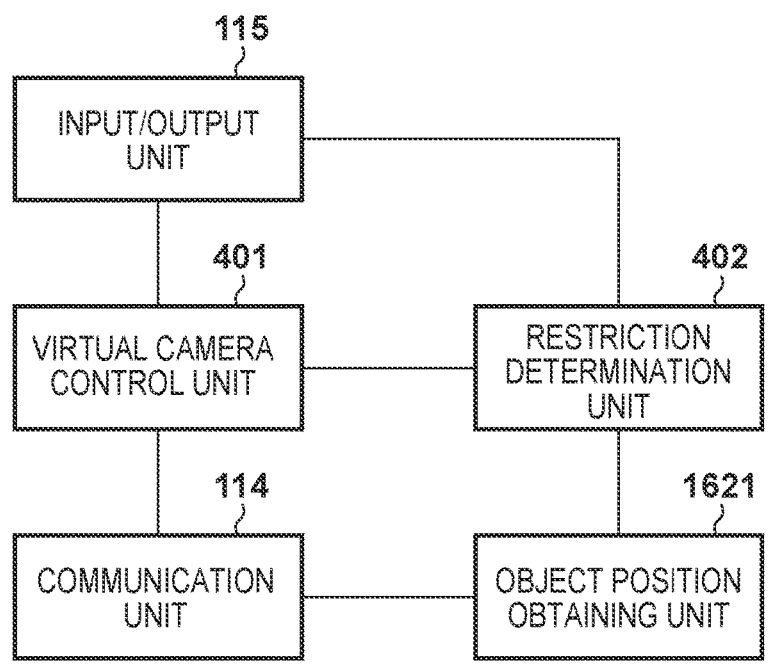
FIG. 16B is a block diagram showing an example of the functional arrangement of an information processing apparatus according to the third embodiment.

FIG. 16B is a block diagram showing an example of the functional arrangement of the information processing apparatus 103 according to the third embodiment. Each function shown in FIG. 16B can be implemented by, for example, a CPU 111 executing a predetermined computer program in the same manner as in the first embodiment. The information processing apparatus 103 according to the third embodiment includes an object position obtaining unit 1621 in addition to a virtual camera control unit 401 and a restriction determination unit 402. The object position obtaining unit 1621 obtains object position information from the object detection system 1601 via a communication unit 114. The restriction determination unit 402 uses, as the position of the target point in the restriction applied to the virtual camera, the object position information obtained by the object position obtaining unit 1621 from the object detection system 1601.

Figure 17A:
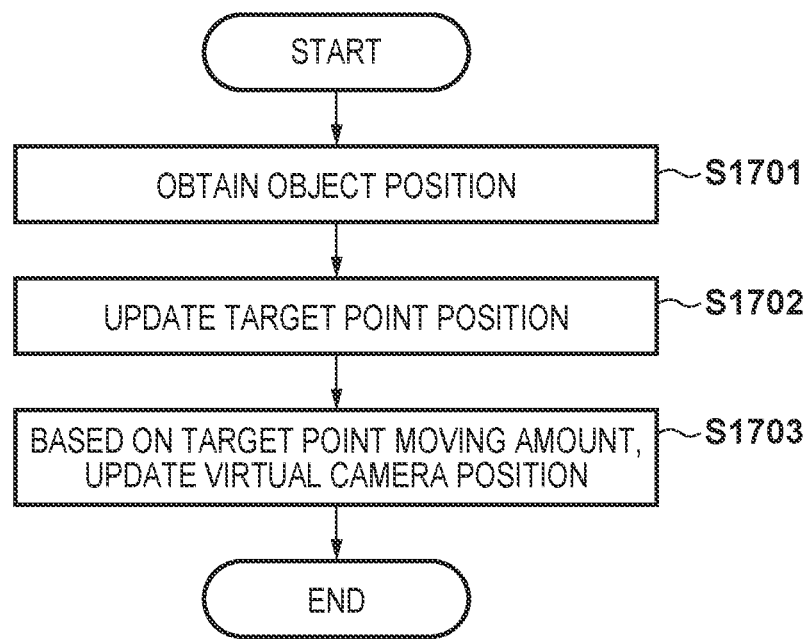
FIG. 17A is a flowchart for explaining processing performed to update a position of a target point according to the third embodiment.

FIG. 17A is a flowchart for explaining target point position update processing according to the third embodiment. This processing will be executed periodically.

The object position obtaining unit 1621 obtains the object position information from the object detection system 1601 (step S1701). The restriction determination unit 402 uses, as the position of the target point in the restriction applied to the virtual camera, the object position information obtained by the object position obtaining unit 1621 (step S1702). If a plurality of objects exist, the object to be used as the position of the target point will be determined based on a user input from an input/output unit 115. Subsequently, the restriction determination unit 402 updates camera parameters (the position, the orientation, and the like) of the virtual camera based on the moving amount of the target point. Note that, for example, the processing (step S1204 in FIG. 12) described in the first embodiment can be used as the processing to change the camera parameters of the virtual camera in accordance with the movement of the target point.

Figure 17B:
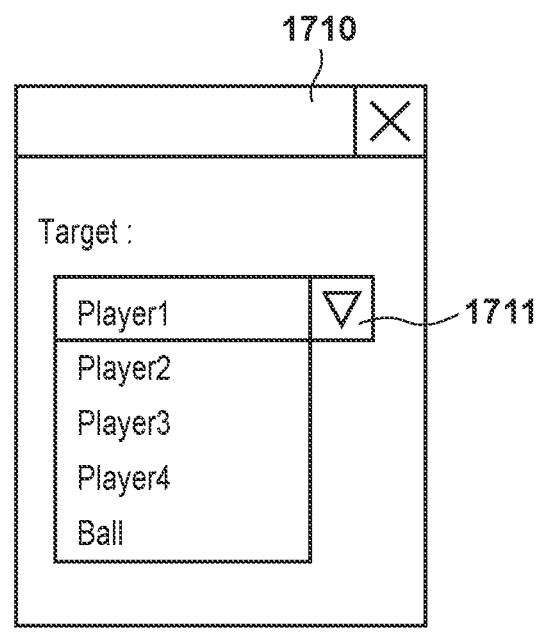
FIG. 17B is a view showing an example of a method by which a user can designate an object among a plurality of objects.

FIG. 17B is a view showing an example of a method by which the user can designate an object from a plurality of objects. A window 1710 is displayed on a display unit 201 and has a function of designating an object to be used as a target point. If the input/output unit 115 includes a pointing device and a touch panel, the user can use these devices to select a GUI component 1711 which is displayed on the window 1710. The GUI component 1711 has a function of selecting one object from a plurality of objects. The restriction determination unit 402 uses the position of the object, selected by the GUI component 1711, as the position of the target point.

An example of a method by which the object detection system 1601 detects the position of an object will be described hereinafter. Based on the object information that has been registered in advance, the object detection system 1601 determines whether the object is included in an image captured by the image capturing system 101. If the object is included, the object detection system detects the position of the object in the image and detects the position of the object in the space by using this result. The three-dimensional shape of a person or an object, the face information of the person, and the information an object surface pattern are used as the object information to be registered in advance.

Note that as another example of the position detection method, the object detection system 1601 may detect the position of the object included in the image based on other pieces of information. For example, based on a premise that a marker is added to the object in advance, the position of the object can be detected by recognizing the marker captured in the captured image. Note that the object detection system 1601 may detect the position of the object by using another method instead of using an image captured by the image capturing system 101. For example, a sensor such as a GPS can be embedded in the object, and the position of the object may be detected by using the information obtained from the sensor. The position of the object may also be detected from afar by using another method such as a laser.

Preferred embodiments of the present invention have been described above. However, the present invention is not limited to these specific embodiments and can incorporate various forms without departing from the scope of the present invention. Also, parts of the above-described embodiments may be combined appropriately. In addition, according to the above-described embodiments, it is possible for a user to select whether to perform an operation on the parameters of a virtual viewpoint under a restricted state or under a non-restricted state. Furthermore, according to the above-described embodiments, even a user who is unaccustomed to setting virtual camera parameters will be able to easily set complicated virtual camera parameters. For example, by setting a restriction on the virtual camera, it becomes possible for the user to easily make complicated virtual camera settings such as the "automatic panning on the spherical surface", the "automatic tilting on the spherical surface", the "automatic panning on the plane", the "automatic tilting on the plane", and the "automatic dolly zoom".

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035422, filed Feb. 28, 2018 which is hereby incorporated by reference herein in its entirety.

What is claimed is:

1. An information processing apparatus comprising:
one or more hardware processors; and
one or more memories which store instructions executable by the one or more hardware processors to cause the information processing apparatus to perform at least:
receiving an input according to an operation performed by an operation device distinguished from a display screen for displaying a virtual viewpoint image generated based on a plurality of images of an area captured with a plurality of imaging apparatuses at different positions;
determining, based on a received input according to a first operation, whether or not to apply a restriction for restricting a moving range, where a virtual viewpoint is movable in a three dimensional space according to a second operation, to a specific surface in a three-dimensional space; and
outputting, in a case where an input according to the second operation is received after the restriction is determined to be applied, a parameter specifying (i) a position of the virtual viewpoint, in the three-dimensional space, having been moved on the specific surface according to the second operation and (ii) a view direction from the virtual viewpoint determined so that the view direction is oriented to a position of a specific point in the three-dimensional space and outputting, in a case where the input according to the second operation is received after the restriction is determined not to be applied, a parameter specifying the position of the virtual viewpoint and the view direction from the position of the virtual viewpoint which are designated by the second operation without the restriction, wherein
the position of the specific point is determined based on a received input according to a third operation, and
the specific surface is determined based on a relationship between the position of the virtual viewpoint and the position of the specific point.

2. The information processing apparatus according to claim 1, wherein the parameter to be output further includes a parameter specifying a zoom value associated with the virtual viewpoint.

3. The information processing apparatus according to claim 2, wherein in a case where the restriction is determined to be applied, the zoom value associated with the virtual viewpoint is restricted so that a size of an object in the area remains constant in the virtual viewpoint image.

4. The information processing apparatus according to claim 1, wherein according to the determining, the restriction among a plurality of predetermined types of restrictions is validated or invalidated.

5. The information processing apparatus according to claim 1, wherein the specific surface is determined such that the position of the virtual viewpoint at a timing of the first operation is located on the specific surface.

6. The information processing apparatus according to claim 5, wherein the specific surface is a plane surface.

7. The information processing apparatus according to claim 6, wherein the plane surface is vertical in the three-dimensional space where the virtual viewpoint is located.

8. The information processing apparatus according to claim 1, wherein the specific surface is a spherical surface.

9. The information processing apparatus according to claim 8, wherein the spherical surface is centered at the specific point in the three-dimensional space that is apart from the specified position of the virtual viewpoint in the view direction.

10. The information processing apparatus according to claim 1, wherein the position of the specific point is determined based on the position and the view direction of the virtual viewpoint at a timing of the first operation.

11. The information processing apparatus according to claim 1, wherein the position of the specific point is determined based on a position of an object in the area.

12. The information processing apparatus according to claim 1, wherein the parameter is output to an apparatus configured to generate the virtual viewpoint image based on the plurality of images.

13. The information processing apparatus according to claim 1, wherein the instructions further cause the information processing apparatus to perform generating the virtual viewpoint image based on the plurality of images and the output parameter.

14. The information processing apparatus according to claim 1, wherein the first operation and the second operation are performed by using different operation areas of the operation device.

15. The information processing apparatus according to claim 1, wherein the position of the virtual viewpoint indicated by a parameter output based on the second operation when the restriction is determined to be applied differs from the position of the virtual viewpoint indicated by a parameter output based on the same second operation when the restriction is determined not to be applied.

16. The information processing apparatus according to claim 1, wherein
the relationship includes a distance between the position of the virtual viewpoint and the specific position, and
the distance is changeable based on a fourth operation.

17. A control method of an information processing apparatus comprising:
receiving an input according to an operation performed by an operation device distinguished from a display screen for displaying a virtual viewpoint image generated based on a plurality of images of an area captured with a plurality of imaging apparatuses at different positions;
determining, based on a received input according to a first operation, whether or not to apply a restriction for restricting a moving range, where a virtual viewpoint is movable in a three dimensional space according to a second operation, to a specific surface, in the three dimensional space; and
outputting, in a case where an input according to the second operation is received after the restriction is determined to be applied, a parameter specifying (i) a position of the virtual viewpoint, in a three-dimensional space, having been moved on the specific surface according to the second operation and (ii) a view direction from the virtual viewpoint determined so that the view direction is oriented to a position of a specific point in the three-dimensional space and outputting, in a case where the input according to the second operation is received after the restriction is determined not to be applied, a parameter specifying the position of the virtual viewpoint and the view direction from the position of the virtual viewpoint which are designated by the second operation without the restriction, wherein
the position of the specific point is determined based on a received input according to a third operation, and
the specific surface is determined based on a relationship between the position of the virtual viewpoint and the position of the specific point.

18. The method according to claim 17, wherein the parameter to be output further includes a parameter specifying a zoom value associated with the virtual viewpoint.

19. A non-transitory computer-readable storage medium storing a program to cause a computer to execute a control method, the method comprising:
receiving an input according to an operation performed by an operation device distinguished from a display screen for displaying a virtual viewpoint image generated based on a plurality of images of an area captured with a plurality of imaging apparatuses at different positions;
determining, based on a received input according to a first operation, whether or not to apply a restriction for restricting a moving range, where a virtual viewpoint is movable in a three-dimensional space according to a second operation, to a specific surface, in the three-dimensional space; and
outputting, in a case where an input according to the second operation is received after the restriction is determined to be applied, a parameter specifying (i) a position of the virtual viewpoint, in the three-dimensional space, having been moved on the specific surface according to the second operation and (ii) a view direction from the virtual viewpoint determined so that the view direction is oriented to a position of a specific point in the three-dimensional space and outputting, in a case where the input according to the second operation is received after the restriction is determined not to be applied, a parameter specifying the position of the virtual viewpoint and the view direction from the position of the virtual viewpoint which are designated by the second operation without the restriction, wherein
the position of the specific point is determined based on a received input according to a third operation, and
the specific surface is determined based on a relationship between the position of the virtual viewpoint and the position of the specific point.

* * * * *